United States Patent [19]
Mandella et al.

[11] Patent Number: 5,887,009
[45] Date of Patent: Mar. 23, 1999

[54] CONFOCAL OPTICAL SCANNING SYSTEM EMPLOYING A FIBER LASER

[75] Inventors: Michael Mandella, Cupertino; Mark H. Garrett, Morgan Hill, both of Calif.

[73] Assignee: Optical Biopsy Technologies, Inc., Morgan Hill, Calif.

[21] Appl. No.: 861,590

[22] Filed: May 22, 1997

[51] Int. Cl.⁶ .................................... H01S 3/30
[52] U.S. Cl. ................................................ 372/6
[58] Field of Search .................... 372/6; 250/227.14, 250/227.17, 227.18, 227.23; 356/5.09, 5.1, 5.14, 4.07, 400, 448

[56] References Cited

U.S. PATENT DOCUMENTS

| | | | |
|---|---|---|---|
| 3,013,467 | 12/1961 | Minsky | 88/14 |
| 4,626,679 | 12/1986 | Kuwayama et al. | 250/227 |
| 4,860,276 | 8/1989 | Ukita et al. | 369/119 |
| 5,091,652 | 2/1992 | Mathies et al. | 250/458.1 |
| 5,120,953 | 6/1992 | Harris | 250/227.2 |
| 5,161,053 | 11/1992 | Dabbs | 359/384 |
| 5,162,942 | 11/1992 | Anzai et al. | 350/587 |
| 5,283,433 | 2/1994 | Tsein | 250/234 |
| 5,283,684 | 2/1994 | Thomas et al. | 359/234 |
| 5,296,703 | 3/1994 | Tsien | 250/235 |
| 5,351,152 | 9/1994 | Kuo et al. | 359/376 |
| 5,389,779 | 2/1995 | Betzig et al. | 250/216 |
| 5,448,417 | 9/1995 | Adams | 372/25 |
| 5,557,452 | 9/1996 | Harris | 359/368 |
| 5,581,345 | 12/1996 | Oki et al. | 356/4.01 |
| 5,778,016 | 7/1998 | Sucha et al. | 372/38 |

OTHER PUBLICATIONS

Barnes, F. et al, *Use of optical fiber heads for optical disk,* Applied Optics, vol. 25, No. 22 Nov. 1986, pp. 4010–4012.

Lee, K et al, *Microlenses on the end of single–mode optical fibers for laser applications,* Applied Optics, vol. 24, No. 19, Oct. 1985, pp. 3134–3139.

Dickensheets, D. et al, *Micromachined scanning confocal optical microscope,* Optics Letters, vol. 21, No. 10, May 1996, pp. 764–766.

Nielson, P et al. *Polarization–sensitive scanned fiber confocal microscope,* Opt. Eng., vol. 35, No. 11, Nov. 1996, pp. 3084–3091.

Giniunas, L. et al., *Scanning fibre–optic polarization microscope,* Opt. Comm., vol. 100, 1993, pp. 31–34.

Kimura, S. et al., *Confocal scanning optical microscope using single–mode fiber for signal detection,* Applied Optics, vol. 30, No. 16, Jun. 1991, pp. 2143–2150.

*Primary Examiner*—Rodney Bovernick
*Assistant Examiner*—Robert E. Wise
*Attorney, Agent, or Firm*—Luren Intellectual Property Services

[57] ABSTRACT

A confocal optical scanning system using a flexible optical emissive fiber or fiber laser and having a lasing cavity defined within the fiber. The system in-couples a signal beam produced when a probe beam generated by the fiber laser is reflected from a scanned object back into the lasing cavity. The perturbation created in the cavity by the in-coupling of the signal beam is detected by a transducer. Specifically, the perturbation may be the signal beam itself, an oscillation mode of the cavity induced by the in-coupled signal beam or a combination of the signal beam and the probe beam. In a preferred embodiment of the invention the system also has a polarizing assembly for altering a signal polarization of the signal beam and rotate it to either a resonant polarization supported by the cavity or a non-resonant polarization not supported by the cavity.

62 Claims, 10 Drawing Sheets

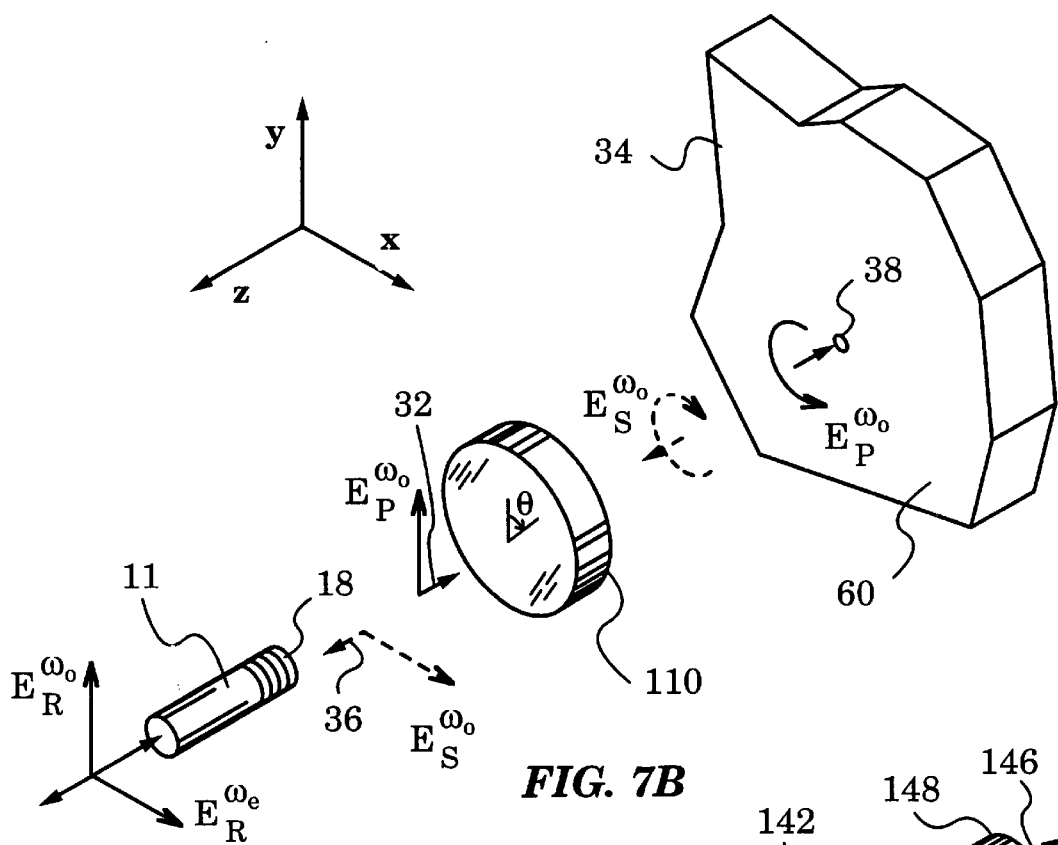
FIG. 7B
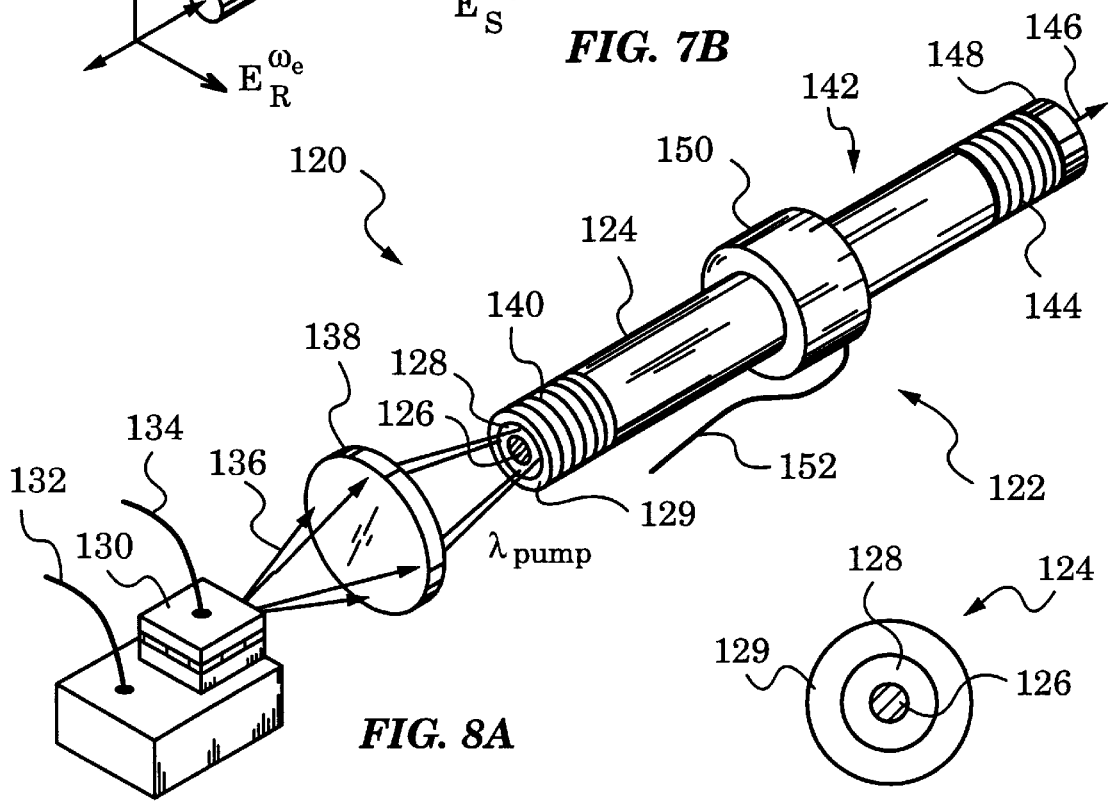
FIG. 8A
FIG. 8B

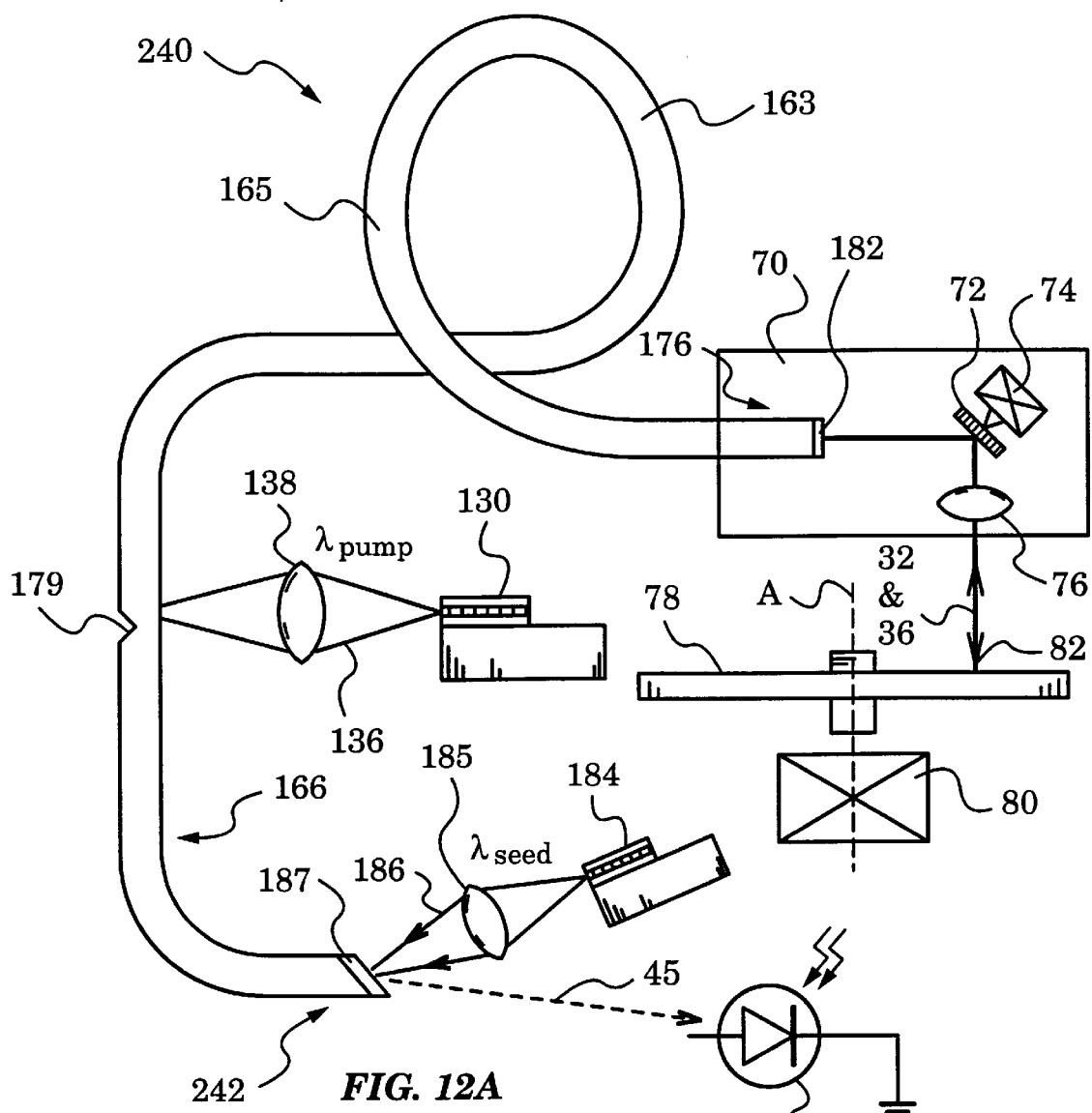
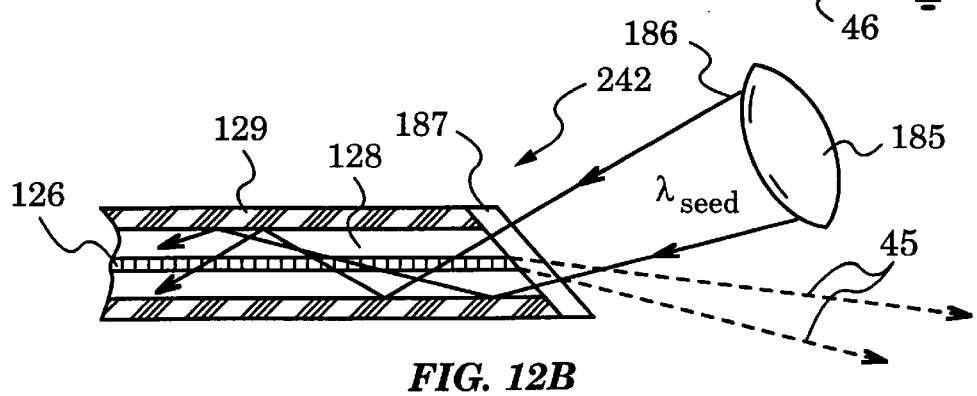
FIG. 12A
FIG. 12B

CONFOCAL OPTICAL SCANNING SYSTEM EMPLOYING A FIBER LASER

FIELD OF THE INVENTION

This invention relates generally to confocal optical systems. More particularly, it relates to confocal optical systems for scanning applications employing a fiber laser for generating and detecting a scanning signal.

BACKGROUND OF THE INVENTION

The field of optics has gained a great deal from the invention of the confocal microscope by Marvin Minsky. This device is described in U.S. Pat. No. 3,013,467. The confocal microscope attains very high resolution because it focuses a point-source signal on a specimen and images the reflected light as a point using a pin-hole aperture. All out-of-focus signals are eliminated by the aperture. Of course, this arrangement limits the microscope's field of view. Thus, the examination of a typical object requires that either the object or the focal point be scanned. The data gathered during a scan can be used to generate a three-dimensional image.

Confocal microscopes can have one of two basic geometries. The first is called the "double focusing" arrangement and it uses two lenses and two apertures. The first aperture produces the point-source signal, which is focused by the first lens on the object. The light passed through the object is focused by the second lens through the second aperture. The second, called the "reciprocal" arrangement, takes advantage of the same lens for focusing the light on the object and focusing the reflected light. A beam splitter is interposed between the light source and the lens such that the reflected signal is deflected to a separate aperture and detection system. Both types are discussed by Minsky and in general literature.

At the present time confocal microscopes are employed in biological, medical, semiconductor and industrial applications. These microscopes rely on a laser light source rather than an apertured extended source to produce the necessary light signal. Additionally, computers and video systems are used to process, store and display detected images. As an example, confocal microscopes are used in systems for optical inspection of silicon wafers and lithographic masks and for the inspection of disks used in data storage. A variety of further applications and correspondingly modified confocal systems are described in the following U.S. Pat. Nos. 5,091,652; 5,162,942; 5,283,433; 5,283,684; 5,296,703; 5,351,152 and 5,581,345.

Due to the large dimensions and cumbersome geometries which limit the applicability of conventional confocal devices and systems there is a need to miniaturize and simplify them. In U.S. Pat. No. 5,120,953 M. R. Harris teaches how to construct a confocal microscope with a single-mode transmissive optical fiber. The end-face of the fiber core provides the aperture from which the laser light issues and into which the light reflected from the object is focused or imaged. Such arrangement relaxes the geometrical constraints of the traditional confocal microscope since the end of the transmissive fiber can be placed at an arbitrary location thus defining the point source location and the image point location.

More extensive teaching on the use of transmissive fibers for carrying the light to a remotely placed photodetector and simultaneously delivering the source light is presented by S. Kimura, et al. in "Confocal Scanning Optical Microscope Using Single-Mode Fiber for Signal Detection", Applied Optics 30 (16), pp. 2143 and Juskaitis, et al. "Imaging in Reciprocal Fibre-Optic Based Confocal Scanning Microscopes", Optics Communications, Vol. 92, (4, 5, 6) pp. 315. Further details and advantages relating to confocal microscopes using various types of transmissive optical fibers are presented in U.S. Pat. No. 5,161,053 to T. P. Dabbs and U.S. Pat. No. 5,557,452 to D. W. Harris. The latter describes the advantage of using a transmissive optical fiber which is scanned in the x-y plane by use of a piezoelectric bimorph cell, which then produces a scanning image of the fiber end over the object without the use of scanning mirrors.

Auxiliary optical elements can be added to a fiber-optic based confocal microscope to make it polarization sensitive so as to perform polarization microscopy. Specifically, a transmissive birefringent optical fiber is used to transmit both, the polarized source light and the polarized return signal. The corresponding teaching is supplied by L. Giniunas, et al. in "Scanning Fiber-Optic Polarization Microscope", Optics Communications, Vol. 100, pp. 31 and P. M. F. Neilson, et al. in "Polarization-Sensitive Scanned Fiber Confocal Microscope", Optical Engineering, 35 (11), pp. 3084.

A miniature confocal microscope head for use in optical disk data storage applications is described in U.S. Pat. No. 4,626,679 issued to T. Kuwayama et al. This head uses a single-mode transmissive fiber in a reciprocal imaging arrangement. In one embodiment, a polarization maintaining optical fiber is used to transmit a linearly polarized beam from the light source to the optical head. The linearly polarized light emerging from the output facet of the fiber then passes through a quarter-wave plate located in the optical head and becomes circularly polarized. After reflection from the surface, the light passes back through the same quarter-wave plate a second time in the opposite direction as it returns to the output facet of the fiber. The returning light is linearly polarized with its plane of polarization orthogonal to the original polarization of the emerging light. Both orthogonal polarization modes are supported by the fiber without mutual interference. A polarizing beam splitter at the other end of the fiber separates the returning light from the injected light and directs the returning light to an optical-to-electrical transducer.

In another embodiment utilizing transmissive optical fibers, a miniature optical head suitable for reading a magneto-optic memory includes a polarizing beam splitter in the optical head to allow one to detect the rotation of the linearly polarized light after it is reflected back with a slight magneto-optically Kerr-induced polarization rotation. The two orthogonal components of polarized light are split off by means of the polarizing beam splitter in the head. The return light is delivered to the detection unit using two additional "return" fibers for subsequent differential detection, as is well-known in the art.

An additional refinement to a confocal system using a transmissive optical fiber is discussed by Juskaitis, et al. in "Fibre-Optic Based Confocal Microscopy Using Laser Detection", Optics Communications, Vol. 99, pp. 105. In this arrangement the light exiting through one end of the lasing cavity is coupled into a single-mode transmissive fiber for reciprocal imaging. The light returned from the object through the fiber is coupled back into the lasing cavity and alters the light intensity as well as the modes supported by the cavity. These changes are detected by a detector placed on the other end of the lasing cavity. Alternatively, when a semiconductor laser is used then the changes can be detected through the diode junction voltage. In that case, the source and the detector are integrated into one device. A discussion of this alternative can be found in R. Juskaitis, et al. "Semiconductor Laser Confocal Microscopy", Applied Optics, 33 (4), pp. 578 (1994).

An additional improvement to this confocal system, also realized by R. Juskaitis, et al. and described in "Spatial Filter by Laser Detection in Confocal Microscopy", Optics Letters, 18 (4), pp. 1135, consists of using the laser's mode confinement properties. For example, a He-Ne laser or a laser diode can be used for reciprocal imaging thus eliminating the need for a fiber optic delivery system altogether. Of course, these non-fiber based systems lack the flexibility inherent in fiber-based systems.

Several other solutions using a laser as an integrated light source and detector are also known. For example, Webb, et al. present a system with a confocally self-detecting micro laser array in U.S. Pat. No. 5,563,710. This system incorporates beam splitters and a photodetector in the optical head for detection of the laser feedback signal.

In a non-confocal arrangement, a different method of laser self-detection can be used. For example, a near-field scanning optical system which employs laser self-coupling to achieve reflective feedback detection is described in U.S. Pat. No. 4,860,276 to H. Ukita, et al. In this design, the optical data storage head uses a semiconductor laser which does not have an output cavity mirror and which must be closely coupled to the recording surface which acts as the missing laser cavity mirror. This system attains a high signal-to-noise ratio in near-field image detection, as long as the distance between the laser and the surface does not vary more than a small fraction of the laser wavelength during a scan.

Another near-field optical microscope using self-coupling is presented by Betzig, et al. in U.S. Pat. No. 5,389,779. In contrast to transmissive fibers this microscope uses an emissive fiber or a fiber laser. The output end of the fiber laser has to be non-reflective and must be situated a distance d less than one wavelength (d<$\lambda$) away from the surface which is being imaged to ensure proper coupling between the laser and the surface. In addition, the cross-section of the output end has to taper down to the same dimension d. These Near-Field Scanning Optical Microscopes do not have the optical sectioning capabilities offered by confocal microscopes, where the image point may be on or within the object, as needed for imaging three-dimensional objects and surfaces. Also, systems of this type require a means for keeping the end of the fiber or laser a fixed distance within one wavelength from the surface, making fast x-y scanning impractical or impossible. In any case, the data rate is limited by such a device because only low power levels can be out-coupled from the tapered tip.

Confocal systems using transmissive fibers exploit the flexibility and miniaturizability afforded by the fibers to adapt the system to various applications. Generally speaking, however, these systems still suffer from many limitations.

First, the small core diameters of the single-mode fibers used in those systems are inefficient at in-coupling of the probe beam from a compact high power ($\geq$100 mW) source. For example, it is difficult to efficiently couple the beam from a high power multi-mode edge-emitting semiconductor laser into the single mode transmissive fiber. The optical power levels which can be in-coupled into a single mode fiber are low because the beams from high power semiconductor lasers typically have poor spatial distribution and relatively high $M^2$ values. Second, the power instability of the source, e.g., mode-hopping from feedback or longitudinal mode hopping induced by temperature changes, etc., is a major factor affecting the signal-to-noise ratio (SNR). Third, the wavelength instability, also due to temperature fluctuations, causes chromatic imaging errors. Fourth, the passive nature of the transmissive fiber does not enable implementation of highly sensitive heterodyne detection methods known in the art for detecting Doppler-shifted signals for high SNR signal detection. In addition, these systems do not accommodate integration of the optical elements (for polarization, isolation, beam in-coupling, beam out-coupling, detection, etc.) of a fiber-based microscope which can provide simple and economical construction. Also, the prior art systems do not provide a source that can be conveniently adjusted to operate at multiple discrete wavelengths over the visible spectrum to take advantage of chromatic focusing using diffractive type focusing elements.

Finally, most of the prior art systems require the costly fabrication of multiple optical elements and experience optical losses because the signal beam and the return beam have to pass through several in-coupling and out-coupling surfaces or elements. Integration of the entire system including the light source would therefore be highly desirable.

OBJECTS AND ADVANTAGES OF THE INVENTION

Accordingly, it is a primary object of the present invention to provide a high-power confocal optical scanning system of appropriate dimensions and geometry to render it useful in fast, small and maneuverable optical arrangements (e.g., optical data storage apparatuses, microscopes, in-situ imaging systems and medical devices).

Another object of the invention is to provide a confocal optical scanning system which allows flexible control over the method and quality of signal detection for specific applications. Specifically, the system is adapted to use several longitudinal modes and/or orthogonal polarization modes for better imaging operation.

Another object of the invention is to provide the confocal system with a high power laser and to limit reflective and transmissive losses. In particular, the geometry and the number of optical elements of the system according to the invention are conveniently optimized while maintaining overall flexibility and simplicity. Also, the resulting system lends itself to integration.

Yet another object of the invention is to provide a low-cost and reliable confocal optical scanning system which provides a high power visible beam at one or several wavelengths.

These and other objects and advantages of the present invention will become apparent after reading the detailed description.

SUMMARY OF THE INVENTION

These objects and advantages are attained by a confocal optical scanning system using a flexible optical emissive fiber or fiber laser having a lasing cavity and being driven by a pump source such as a semiconductor laser to deliver a probe beam. The lasing cavity is delimited by a reflecting element such as a Distributed Bragg Reflector (DBR) at its first end. An output coupling element, which can also be a DBR, is positioned at a second end of the cavity. The probe beam is coupled out through the output coupling element and delivered to beam shaping optics for focusing it on a scan point on or within an object to be scanned.

The probe beam is scattered or reflected from the point on the object in the form of a signal beam. The beam shaping optics focus the signal beam on the output coupling element, which can be conveniently located at an end of the fiber laser, such that the signal beam is in-coupled into the lasing cavity.

A transducer is provided for detecting an optical perturbation in the cavity. This optical perturbation is a direct consequence of coupling the signal beam into the cavity. Specifically, the perturbation may simply be the signal beam itself, an oscillation mode of the cavity induced by the in-coupled signal beam or a combination of the signal beam and the probe beam.

In a preferred embodiment of the invention the system also has a polarizing assembly for altering a signal polarization of the signal beam. Suitable polarizing elements can be selected from among Faraday rotators, polarizing filters, retardation plates, polarizing plates and the like. The signal polarization can be rotated to either a resonant polarization supported by the cavity or a non-resonant polarization not supported by the cavity. Advantageously, in either case, a Brewster grating in the fiber laser is used to out-couple the signal beam from the cavity to a transducer for detection.

In the event that the perturbation in the cavity is an oscillation mode an out-coupling element either within the fiber laser or external to it is used to direct that mode to the transducer. This element can, of course, be a Brewster grating, or any other well-known element used for deflecting a portion of a beam from its original beam path.

An analogous approach is taken when the perturbation is a combination of the signal beam and the probe beam. In fact, this situation is particularly well-suited for high-sensitivity heterodyne detection.

Suitable fibers for use in the fiber laser will depend on the particular application. Polarization maintaining fibers can be used in polarization-sensitive detection techniques. Of course, single-mode, multi-mode and double-clad fibers can also be used. Rare-earth doped double-clad fibers having an outer and inner cladding and an active central core are particularly useful. That is because a pump beam generated by the pump source can be in-coupled into the inner cladding to stimulate lasing in the active central core.

Finally, the system according to the invention has a scanning mechanism for moving the scan point focused on or within the object. Suitable scanning elements are well-known in the art and include mirrors, reflectors, acousto-optic deflectors, electro-optic deflectors, mechanical scanning apparatus and the like. Depending on which scanning elements are selected, the scanning can be performed by moving the object, displacing the fiber laser (specifically the second end of the cavity—preferably coincident with an end face of the fiber laser) adjusting the signal beam or any combination of these scanning methods.

Suitable beam shaping elements are also well-known in the art and include focusing lenses, GRIN lenses, gratings and the like. Other conventional elements, e.g., optical seeders, Q-switches, optical intensity modulators, optical switches, optical filters etc. can also be added to the system according to invention whenever convenient.

The details of the invention are presented in the detailed description and the attached drawing figures.

DESCRIPTION OF THE FIGURES

FIG. 7B is an isometric view of a system using another polarization control.

FIG. 8A is an isometric view illustrating a portion of an integrated system according the invention using a double-clad optical fiber laser.

FIG. 8B is a cross-sectional view of the double-clad emissive fiber of FIG. 8A.

FIG. 12A is a diagram of an alternative MOPA embodiment for data storage applications.

FIG. 12B is a cross-sectional view of the end-pumped section of the fiber of FIG. 12A.

DETAILED DESCRIPTION

1. THEORY OVERVIEW

The present invention depends on the effects produced inside a lasing cavity when laser light generated by the laser is reflected back into the cavity. In most applications this back-coupling is undesirable. Optical isolators with non-reciprocal polarizers, filtering arrangements or even angled laser facets are used to eliminate back-coupling. According to the invention, however, this back-coupling of light scattered or reflected from an object is necessary for measurement purposes.

The effects of laser feedback and the resulting perturbation of laser power and frequency depend on many conditions and a complete analytical theory does not exist at this time. Much of the behavior is described by solving the rate equations for a laser with a feedback term incorporated as introduced by Lang and Kobayashi in IEEE Journal of Quantum Electronics, Vol. 16, pp. 347. Juskaitis, et al. in "Spatial Filter by Laser Detection in Confocal Microscopy", Optics Letters, 18, Vol. 4, pp. 1135 describe the operation of the laser based confocal microscope and show how the feedback light emanating from the object modifies the cavity modes and the output power. These papers are hereby incorporated by reference.

Since the change in the cavity modes occurs on a time frame of typically 1 GHz and the scanning rate for a confocal system according to the invention is around 1 MHz the cavity modes reach steady-state much more rapidly than any changes resulting from scanning the object.

The response of the lasing cavity to feedback is determined by a dimensionless feedback parameter C:

$$C = \kappa \frac{\tau_{ext}}{\tau_L} \sqrt{1+b^2} \ ,$$

where $\kappa$ is the ratio of the amplitude reflected from the laser mirror, $\tau_{ext}/\tau_L$ is the ratio of the round-trip time in the external cavity to that of the laser and SQRT $(1+b^2)$ is the dependence on the linewidth factor of the laser. The parameter b depends on the type of lasing medium.

The feedback produces an optical perturbation response signal which takes the form:

$$I = \sin c \left(\frac{u}{2}\right) \cos\left[\frac{u}{2} \cot^2\left(\frac{u}{2}\right)\right],$$

in which u is related to the axial distance z by $u=(9\pi/\lambda)$ z $\sin^2(\alpha/2)$. In this relation $\lambda$ is the wavelength of the signal light or beam $(\lambda_s)$ and $\sin(\alpha)$ is the numerical aperture of the beam shaping system—typically a condenser lens. For a semiconductor laser with a short coherence length the perturbation signal is just:

$$I = \left| \sin c \left(\frac{u}{2}\right) \right|.$$

The information summarized in these equations and appearing in the papers is used to determine the type of perturbation response signal expected in the system of the invention.

2. EMBODIMENTS AND OPERATION

Figure 1:
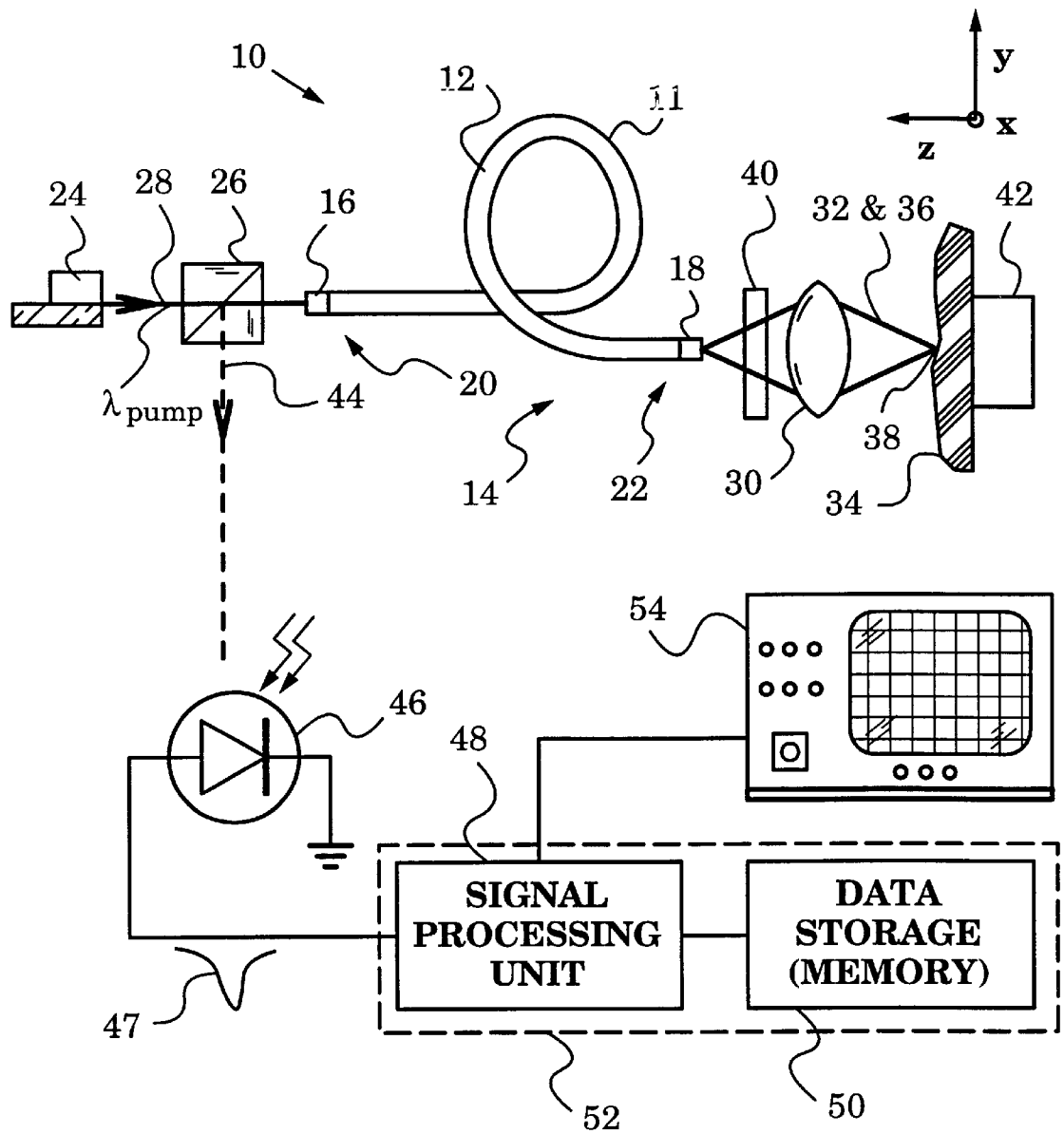
FIG. 1 is a diagram of a confocal scanning system according to the invention.

A fiber laser based confocal scanning system 10 according to the invention is illustrated in FIG. 1. For reference purposes the coordinate axes are indicated in the drawing figure with the x-axis being perpendicular to the plane of the paper. System 10 has an emissive fiber 11 with a fiber laser 12 having a lasing cavity 14. Cavity 14 is defined by a reflector 16 and an output coupler 18 at a first end 20 of emissive fiber 11 and a second end 22 of emissive fiber 11 respectively. Of course, cavity 14 does not have to terminate at the ends of fiber 11. For example, a section of non-emissive fiber can be fusion spliced between first end 20 of emissive fiber 11 and reflector 16, or between second end 22 of emissive fiber 11 and output coupler 18 in order to lengthen cavity 14 without lengthening emissive fiber 11.

A pumping source or pump laser 24, e.g., a solid state laser, a laser diode, a fiber laser or the like is positioned at first end 20 of emissive fiber 11. A beam splitter 26 is placed such that a pump beam 28 issuing from pump laser 24 is coupled into cavity 14 via reflector 16, which is transmissive to a pump wavelength $\lambda_{pump}$ of pump beam 28. It is understood that additional lenses or other optics may be required to properly couple pump beam 28 into cavity 14. These elements are well-known to a person with average skill in the art and are not shown.

A beam shaping element or focusing optics in the form of a focusing lens 30 are located next to output coupler 18 at second end 22. Depending on the application, focusing lens 30 can be replaced by a GRIN lens, a micro-lens, a diffractive lens, a focusing grating element, a refractive lens, a holographic optical element (HOE), a solid immersion type lens (SIL), or even a binary lens. Proper selection of beam shaping elements is well-known in the art.

In the present embodiment, lens 30 is positioned such that a probe beam 32 produced by fiber laser 12 and emanating through output coupler 18 is properly focused at a scan point 38 on or within an object 34 to be examined or scanned. Also, lens 30 is positioned such that a signal beam 36 reflected or scattered from object 34 is focused on output coupler 18 or second end 22 and enters cavity 14. In other words, the arrangement of lens 30 is confocal with respect to the output coupler 18 and scan point 38.

System 10 further includes a scanning element schematically shown as scanning device 40, e.g., an acousto-optic deflector, an electro-optic deflector or an electro-mechanical scanning micro-mirror for scanning point 38 over object 34. In fact, any device using a method or combination of methods that allow scan point 38 to be moved relative to object 34 in a controlled fashion could serve as scanning device 40. Preferably, device 40 is used for fast scanning of small areas or volumes or for tracking fine structures on or within object 34. Meanwhile, entire object 34 is moved with the aid of a scanning mechanism 42, e.g. a scanning table which can move object 34 in all three directions (x-y-z) for complete three dimensional imaging or any combination of scanning patterns defined by the path of point 38 relative to object 34 (see FIG. 2). Also, scanning mechanism 42 can be a spindle mounted on an armature for rotating object 34 about the z axis and moving object 34 radially in the x-y plane. This arrangement results in a circular or spiral type of scanning pattern. Alternatively, object 34 can be scanned by moving second end 22 of emissive fiber 11 relative to lens 30, thereby moving scan point 38 relative to object 34. In any case, these methods of scanning are well-known to a person of average skill in the art.

Beam splitter 26 is placed in the path of pump beam 28 and any beam of light exiting cavity 14 through reflector 16. Specifically, splitter 26 is set up to deflect an optical perturbation 44, which may be represented by signal beam 36 or a portion thereof, probe beam 32, a combination of beams 32 and 36 or an oscillation mode within cavity 14 leaking through reflector 16. Perturbation 44 is indicated by a dashed line impinging on a transducer or photodetector 46.

A signal processing unit 48 and accompanying memory or data storage 50, usually contained in a single device 52, e.g., a computer are connected to photodetector 46. A display unit 54 such as an oscilloscope is also connected to signal processing unit 48 or computer 52.

Figure 3:
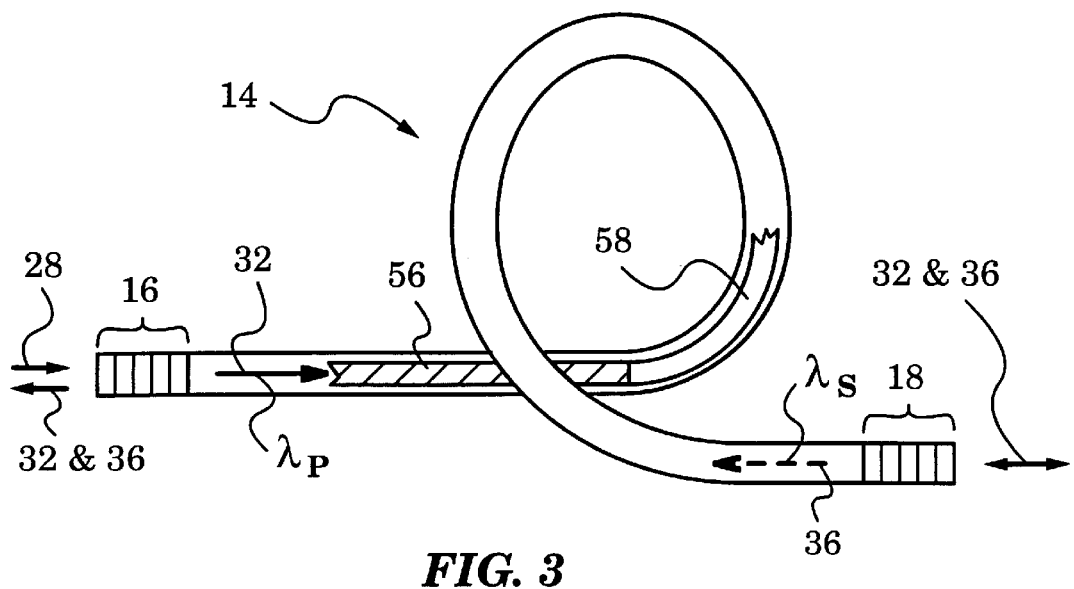
FIG. 3 is a diagram of the fiber laser of FIG. 1.

During operation pump beam 28 propagating at pump wavelength $\lambda_{pump}$ enters cavity 14 through DBR 16, which is transmissive at $\lambda_{pump}$. Inside cavity 14 pump beam 28 excites an active central core 56 of emissive fiber. 11 and causes fiber laser 12 to generate probe beam 32 as shown in FIG. 3. This happens because active central core 56 contains a solid lasing medium which is typically doped with an active lasing ionic species, preferably a rare-earth ionic species such as $Tm^{3+}$ (Thullium), $Er^{3+}$ (Erbium), $Pr^{3+}$ (Praseodymium), $Ho^{3+}$ (Holmium), $Yb^{3+}$ (Ytterbium) or the like. The fiber core material serving as a host for the active laser ions may be a crystal or glass material such as ZBLAN fluorozirconate fiber. Active central core 56 serves both functions of providing optical amplification at one or more laser wavelengths and supporting one or more optical waveguide modes at these same wavelengths. Furthermore, since active central core 56 is contained within cavity 14 and is pumped by pump beam 28 the conditions for laser oscillation exist, thereby generating probe beam 32. In other words, active central core 56 provides an active waveguide extending along the central portion of emissive fiber 11 and, when excited by pump beam 28, generates probe beam 32 at a probe wavelength $\lambda_p$.

Probe beam 32 can consist of many closely spaced wavelengths or longitudinal modes determined by the length of cavity 14, or it may consist of several wavelengths spanning across the visible spectrum, e.g., red, orange, green and blue. This will be determined by parameters such as pump power, pump wavelength $\lambda_{pump}$ or the combined effect of pump wavelengths, spectral dependence of reflectors 16 and 18, the type and concentrations of different combinations of active ionic species or the type of host material used in active central core 56.

As shown in FIG. 3, active central core 56 extends along a section (active section) of cavity 14; the remaining portion of cavity 14 has a regular or non-doped core 58. The length of the active section generally determines the power capability of fiber laser 12. The length of cavity 14 determines the number of longitudinal modes that can oscillate within the gain bandwidth of the lasing medium according to well-known relationships. As a rule, the longer the active section the higher the output power, and the longer cavity 14 the larger the number of longitudinal modes. A person of average skill in the art will be able to choose the optimal active length and cavity length depending on what output parameters are desired and other design choices in constructing system 10.

In some cases it is preferable to use a Distributed Bragg Reflector (DBR) as reflector 16 or as output coupler 18. In the embodiment shown deflector 16 is a Distributed Bragg Reflector (DBR) tuned to reflect probe wavelength $\lambda_p$ and output coupler 18 is also a DBR tuned to $\lambda_p$ but exhibiting a lower reflectivity than DBR 16. As a result probe beam 32 is coupled out through DBR 18.

Figure 2:
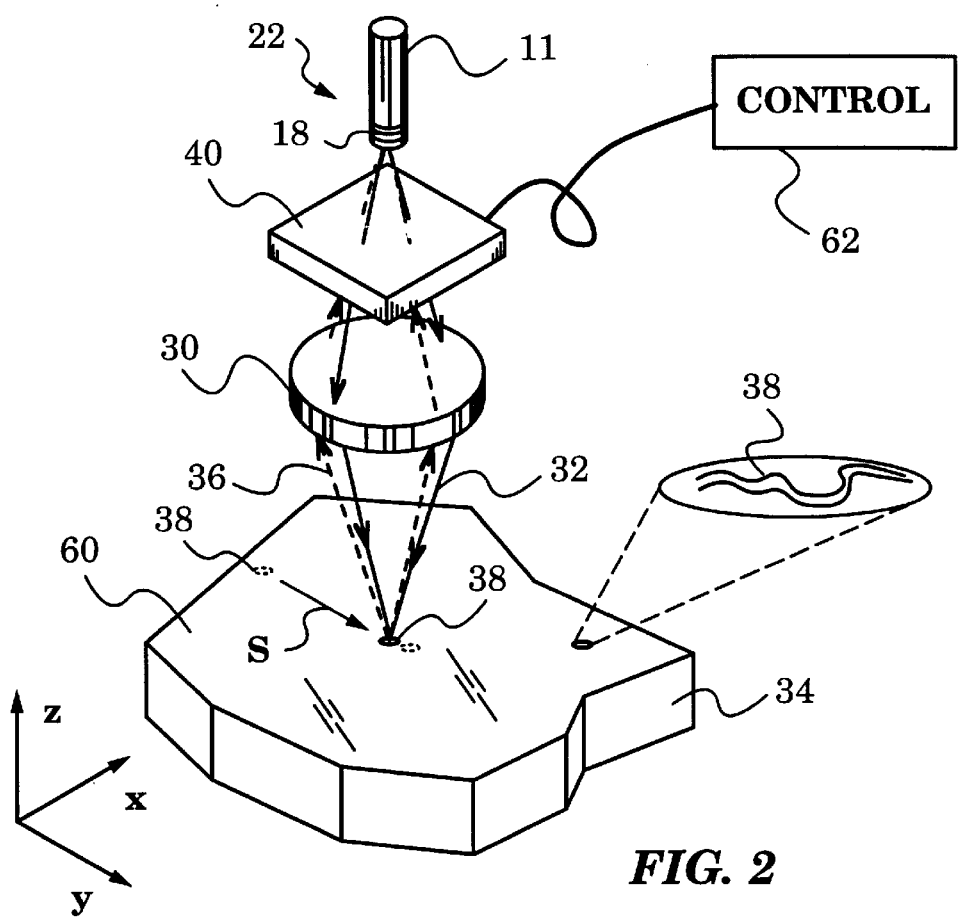
FIG. 2 is an isometric view of a portion of the diagram of FIG. 1.

As shown in FIG. 2, out-coupled signal beam 32 is adjusted or scanned by scanning device 40 and associated control 62. Typically, device 40 deflects probe beam 32 and is used for rapid high resolution scanning or in cases when object 34 is sufficiently small. Subsequently, probe beam 32 is focused at point 38 on surface 60 of object 34 by lens 30. A magnified view of point 38 shows the surface contours which reflect or scatter probe beam 32 and produce signal beam 36. Beam 36 reflected by object 34 is designated by dashed lines for clarity.

Of course, it is understood that scanning element 40 and scanning mechanism 42 (not visible in this figure) can be used to ensure that probe beam 32 is focused on scan point 38 inside object 34. In this instance, however, point 38 is scanned along the y-direction, as indicated by arrow S marking the path of point 38.

After undergoing reflection at point 38 signal beam 36 is focused on second end 22 of fiber 11 or on output coupler 18. Thus, signal beam 36 is in-coupled back into lasing cavity 14. During reflection beam 32 will undergo a change. Most commonly, the intensity of signal beam 36 is reduced in comparison to the intensity of probe beam 32. In other cases, signal beam 36 will have a signal wavelength $\lambda_s$ different from probe wavelength $\lambda_p$, e.g., due to a Doppler shift induced by scanning over rough surface at a high scan rate. In addition, polarization changes may occur upon reflection.

As shown in FIG. 3, after passing through cavity 14, a portion of signal beam 36 is out-coupled through DBR 16. Referring now to FIG. 1, it is apparent that signal beam 36 out-coupled through DBR 16 is, in fact, optical perturbation 44. Of course, optical perturbation 44 will have a low intensity because signal beam 36 is first reflected at point 38, in-coupled into cavity 14 and finally transmitted through DBR 16. During transmission through DBR 16 the intensity of beam 36 is significantly reduced. This is especially true when signal wavelength $\lambda_s$ is equal to probe wavelength $\lambda_p$, ($\lambda_s = \lambda_p$). Counterbalancing this effect is the amplification which signal beam 36 experiences while passing through active central core 56 inside cavity 14.

In the event that reflection from object 34 alters signal wavelength $\lambda_s$, ($\lambda_s \neq \lambda_p$), DBR 16 will not be as closely tuned and a larger portion of signal beam 36 will exit in the form of perturbation 44.

Beam splitter 26 deflects perturbation 44 to photodetector 46. Of course, since $\lambda_s$ will in general vary significantly from $\lambda_{pump}$, a dichroic element or a wavelength-sensitive filter can also be used for this purpose. Also, beam splitter 26 can be a polarizing beam splitter which allows properly oriented polarized light from pump source 24 to pass through without a portion of pump beam 28 being deflected. Accordingly, it may also be arranged for optical perturbation 44 to be polarized orthogonal to the pump beam polarization, thereby deflecting a larger portion of optical perturbation 44 to photodetector 46. This arrangement serves both functions of providing more efficient in-coupling of pump beam 28 and higher signal strength at photodetector 46.

Next, perturbation 44 impinges on photodetector 46, which converts it into an electronic signal 47. Signal 47 is sent to signal processing unit 48 for evaluation and comparison with data already stored in data storage 50. In particular, electronic signal 47 will reflect the intensity fluctuation or signal wavelength $\lambda_s$ fluctuation or polarization fluctuation of optical perturbation 44 produced by the contours, reflectivity or other optical characteristics of surface 60 at point 38 (see enlarged point 38 in FIG. 2). These fluctuations are assessed by signal processor 48 in view of scaling or calibration data in memory 50 according to known methods. The result is displayed on display unit 54 and preferably stored in memory 50 for future reference.

An entire scanning cycle has to be performed to gather a complete set of information about object 34. Rapid high resolution scanning is effectuated with the aid of scanning device 40 operated by control 62. However, a typical scanning run will take advantage of mechanism 42 to move entire object 34. In this manner, surface 60 of object 34 can be mapped out based on intensity, wavelength or polarization fluctuation data in optical perturbation 44 obtained during the scan.

Of course, point 38 can be focused within object 34 for bulk scanning. Such scanning procedure will yield an x-y and z map of object 34. Point 38 is scanned in the z direction by physically moving object 34 towards or away from lens 30 in the z direction or by moving lens 30 towards or away from second end 22. Alternatively, adjusting the focus of lens 30 by changing probe wavelength $\lambda_p$ is also possible, especially in cases when lens 30 is a diffraction type focusing element with a relatively high chromatic aberration. Suitable focusing elements for wavelength controlled scanning include zone plates, diffractive lenses, binary lenses or holographic optical elements (HOE). The wavelength-based technique is termed chromatic scanning and is preferably used with fiber laser 12 operating at many discrete wavelengths or tunable over a wide wavelength range. For instance, when focusing lens 30 is a zone plate its focal length is inversely proportional to probe wavelength $\lambda_p$. It is well-known that fiber laser 12 can be constructed to provide tunability over the required bandwidths to perform chromatic z scanning.

By using fiber laser 12 as its central component scanning system 10 can operate at high-power levels while retaining the advantages and flexibility of emissive fiber 11. The geometry of system 10 is simple and the number of elements is limited in comparison with other confocal systems. Also, fiber laser 12 can generate many probe wavelengths $\lambda_p$, including those in the visible range.

In a simple modification of system 10, beam splitter 26 is placed in front of end 22 such that optical perturbation 44 is coupled out after one round-trip through cavity 14. Also, photodetector 46 is realigned to receive optical perturbation 44 from beam splitter 26. This can be done given sufficient room between lens 30 and output coupler 18. The result is an increase in the strength of optical perturbation 44 coupled-out from cavity 14 and hence stronger electronic signal 47.

Figure 4:
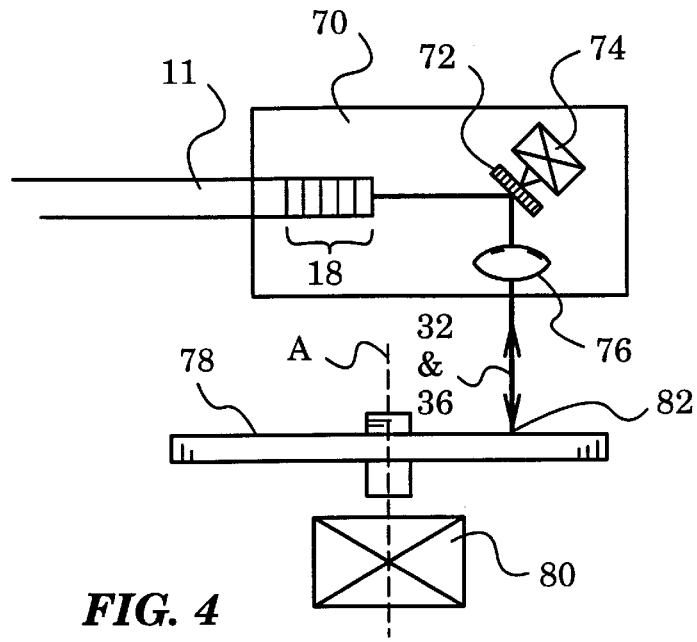
FIG. 4 is a diagram illustrating an optical head for use with the confocal system of the invention.

Scanning system 10 can be used in a variety of applications such as microscopy, materials science, medicine, optical data storage and many other fields. FIG. 4 illustrates how system 10 can be adapted to a flying head 70 for use in optical data storage.

For this purpose, while the rest of system 10 remains unaltered, output coupling DBR 18 of emissive fiber 11 is securely mounted in head 70 at one end. The opposing end of head 70 is equipped with a scanning mirror 72 controlled by a scanner motor 74. An objective lens 76 of miniature proportions is located below mirror 72.

An optical disk 78 rotated about axis A by drive motor 80 is positioned below flying head 70. In a typical system head 70 is very small in comparison to disk 78 and it floats on an air cushion as disk 78 spins. Additional mechanical devices, e.g., arms or slides (not shown) are used to position and retract head 70.

During operation probe beam 32 exits DBR 18 and is deflected by mirror 72 to lens 76. Preferably, for compact and light-weight construction mirror 72 is a scanning electro-mechanical micro-mirror fabricated using well-known Micro-Electro-Mechanical-Systems (MEMS) technologies. Lens 76 focuses beam 32 on the surface of disk 78 at scan point 82 to read, write or erase data according to known techniques. Fine adjustments of point 82, i.e., tracking functions such as skipping from track to track or scanning to sense the relative position of a track for servo-control of head positioning mechanisms are performed by deflecting beam 32 using mirror 72. Larger adjustments are performed by the mechanical arrangement (not shown) for positioning optical head 70. The data access rate and writing rate are generally determined by the rotational velocity of disk 78.

Probe beam 32 impinges on the surface of disk 78 at scan point 82. Depending on the data written at point 82, reflected signal beam 36 will vary in intensity, wavelength or polarization. According to the method described above, system 10 is used to determine the value of the data by analyzing optical perturbation 44 generated by signal beam 36. In this case signal processing unit 48 can be hooked up to appropriate auxiliary circuitry for performing useful functions on the retrieved data or supplying data to be stored.

To read, write or erase data one has to select the appropriate probe wavelength $\lambda_p$ and/or intensity of probe beam 32. Intensity adjustments are standard and can be performed by adjusting the pump power or using optical switches, adjustable filters, electro-optic modulators, acousto-optic modulators, liquid crystal light modulators and similar devices positioned along the path of beam 32. These same devices can also be used for rapid modulation of probe beam 32 for writing data on disk 78. Probe wavelength $\lambda_p$ delivered by laser 12 can be easily adjusted using gratings, prisms, varying the pump power, varying pump wavelength $\lambda_{pump}$, etc. In a typical optical disk device the laser power at disk 78 is modulated between a high and low level for data recording, typically 15–20 mW and 0.5 mW. A power level of 2 mW is generally used for reading and 8 mW for erasing.

Figure 5:
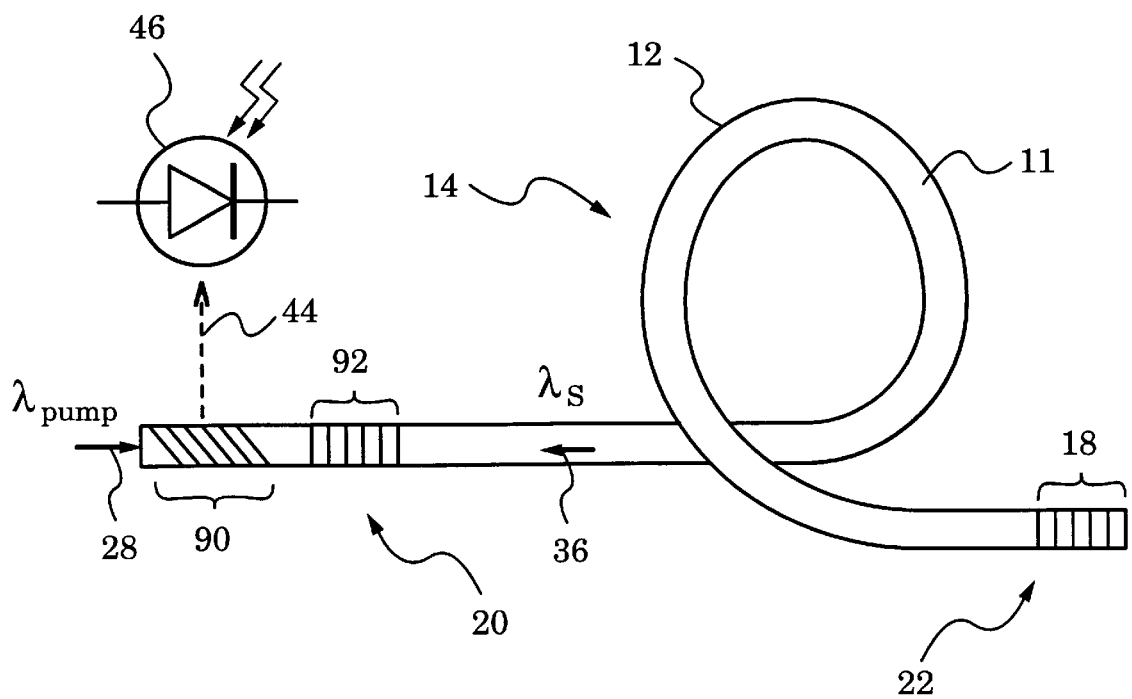
FIG. 5 is a diagram of a laser fiber with an external Brewster grating for deflecting the perturbation response signal to a transducer.
Figure 6:
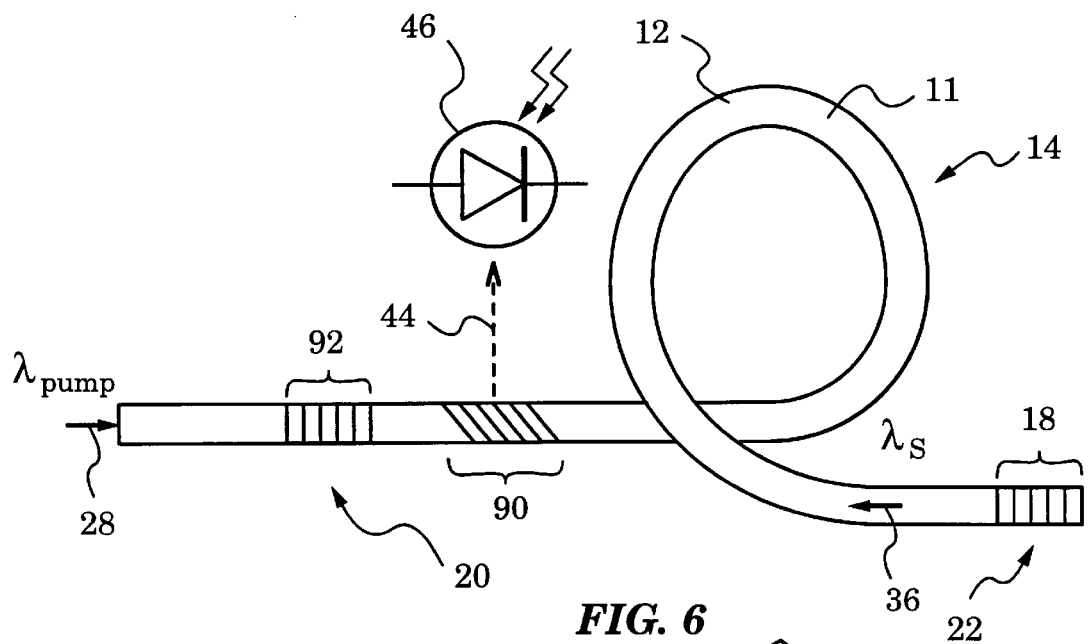
FIG. 6 is a diagram of a laser fiber with an internal Brewster grating for deflecting the perturbation response signal to a transducer.

FIGS. 5 and 6 show an advantageous modification to fiber laser 12 of system 10. In FIG. 5 cavity 14 is terminated at second end 22 by DBR 18 mounted at the end of emissive fiber 11, as before. In contrast, first end 20 of cavity 14 is not located at the other end of emissive fiber 11, but away from the fiber's end. A Brewster grating 90 is located at the end of emissive fiber 11 instead. In fact, grating 90 is a polarization sensitive deflecting element and replaces beam splitter 26 in this embodiment.

Pump beam 28 has pump wavelength $\lambda_{pump}$ and a polarization allowing it to pass through grating 90 undisturbed and be coupled into cavity 14 through a DBR 92. Instead, grating 90 is tuned to deflect optical perturbation 44 or signal beam 36 exiting cavity 14 through DBR 92. If desired, emissive fiber 11 can be of the polarization maintaining type to ensure that the polarization of signal beam 36 is in the appropriate plane to obtain maximum deflection by grating 90. There are many well-known methods for producing polarization maintaining fibers such as elliptical core construction or bow-tie construction causing stress-induced birefringence of the core (Hi-Bi).

FIG. 6 illustrates the case where grating 90 is located within cavity 14. In this embodiment optical perturbation 44 will exhibit a much higher signal strength since it does not have to pass through DBR 92 first.

Figure 7A:
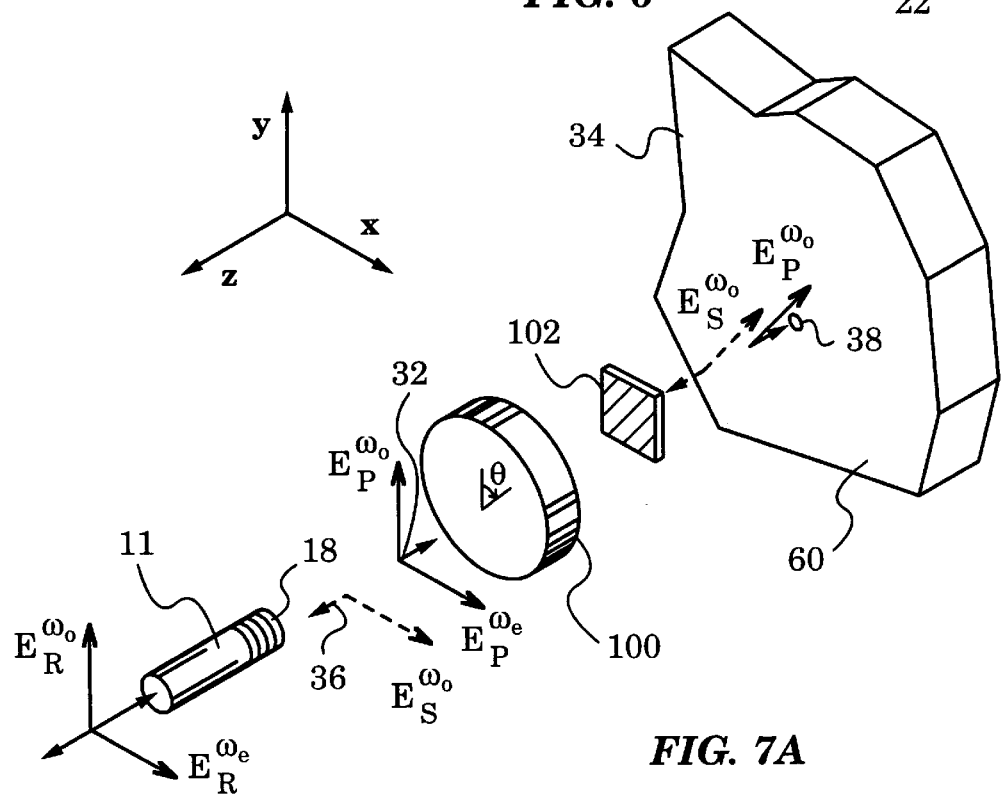
FIG. 7A is an isometric view of a system using polarization control.

FIG. 7A illustrates scanning system 10 adapted for polarization-sensitive scanning. All scanning elements and beam shaping optics have been omitted for clarity. A terminal portion of emissive fiber 11 with DBR 18 is arranged in line with a polarizing device represented by a Faraday rotator 100 and a polarizer 102 having a polarization axis inclined at 45° to the y axis. In fact, the hatching indicates the polarizing axis of filter 102.

Emissive fiber 11 is selected such that cavity 14 supports two orthogonal polarization modes, an ordinary mode $E^{\omega_o}_R$ and an extraordinary mode $E^{\omega_e}_R$. The superscripts designate the angular frequencies $\omega_o$ and $\omega_e$ of the ordinary and extraordinary polarizations. The subscript R indicates that both modes are supported by cavity 14 (resonant). In general, many longitudinal mode frequencies of each polarization may be supported by cavity 14 depending on its length and the bandwidth of DBR 18. The birefringence of the polarization maintaining fiber causes the optical path lengths of the two polarization modes to be different; thus the longitudinal mode frequencies of each polarization mode are different. In fact, modes $E^{\omega_o}_R$, $E^{\omega_e}_R$ represent two of many possible resonant longitudinal modes of each polarization supported by cavity 14 which have oscillation frequencies given by $\omega_o$ and $\omega_e$ respectively. The difference between these two frequencies will be approximately the same as the difference between the next higher frequency longitudinal modes of each polarization. Therefore, many pairs of modes of each polarization will be found to have approximately the same frequency differences between them. For simplicity, analysis of the operation of the fiber laser will be illustrated by considering only one pair of longitudinal modes of each polarization, namely the $E^{\omega_o}_R$ mode and the $E^{\omega_e}_R$ mode.

Since cavity 14 supports the $E^{\omega_o}_R$ and $E^{\omega_e}_R$ modes, probe beam 32, marked by its k-vector, will have both polarization components $E^{\omega_o}_P$ and $E^{\omega_e}_P$. Faraday rotator 100 is set up to rotate both polarization components by angle θ=45° in the clockwise direction. After this rotation only the ordinary component $E^{\omega_o}_P$ is aligned with the polarizing axis of polarizer 102. Consequently, $E^{\omega_e}_P$ is filtered out and probe beam 32 arriving at scan point 38 on surface 60 of object 34 contains only the $E^{\omega_o}_P$ polarization mode. As a result, reflected signal beam 36, also indicated by its k-vector, contains only the $E^{\omega_o}_S$ polarization mode inclined at 45° to the y-axis. Since $E^{\omega_o}_S$ remains aligned with the polarizing axis of polarizer 102 signal beam 36 passes through it and propagates to Faraday rotator 100. The latter rotates polarization $E^{oo}{}_S$ clockwise by 45° such that it is aligned with the $E^{oe}{}_R$ mode supported by cavity 14.

Signal beam 36 with the $E^{oo}{}_S$ polarization mode rotated to match the polarization of resonant mode $E^{oe}{}_R$ of probe beam 32 will cause an interference between the two frequencies. In other words, interference is produced between signal beam 36 and the $E^{oe}{}_R$ portion of resonant radiation equivalent to $E^{oe}{}_P$ polarization of probe beam 32. In a particularly advantageous embodiment this interference between signal beam 32 and probe beam 36 produces a beat signal at a beat frequency $\omega_{beat} = |\omega_o - \omega_e|$. In the case of many longitudinal modes of each polarization, the beat frequencies between corresponding pairs of modes of each polarization are approximately the same.

In fact, the beat signal represents optical perturbation 44 which is out-coupled to photodetector 46. The advantages and methods of measuring the beat signal (also called heterodyning) are well-known in the art. Preferably, in this embodiment Brewster grating 90 as shown in either FIG. 5 or FIG. 6 is used for out-coupling optical perturbation 44 to photodetector 46.

It is also possible to use the arrangement shown in FIG. 7A with emissive fiber 11 emitting only one of the two polarization modes $E^{oo}{}_R$ and $E^{oe}{}_R$. For example, emissive fiber 11 can be made such that it does not emit oscillations along the slow axis, i.e., in the $E^{oe}{}_R$ mode. Fiber gratings at Brewster's angle inside cavity 14 as shown in the arrangement of FIG. 6 can be used as a grating tap to couple out a predetermined amount of light along one polarization. This causes one polarization to experience more loss than the other, thereby allowing fiber laser 12 to lase only in the less lossy polarization mode and causing probe beam 32 to be linearly polarized output $E^{oo}{}_P$. In this case polarization $E^{oo}{}_S$ of signal beam is rotated by rotator 100 to the non-oscillating waveguide polarization mode of fiber 11 and it alone represents optical perturbation 44. It is preferable to use Brewster grating 90 inside cavity 14 as shown in FIG. 6 to out-couple optical perturbation 44.

The embodiment in FIG. 7B is similar to that in FIG. 7A, however, a λ/4 retardation plate 110 is used in place of Faraday rotator 100 and polarizer 102. Emissive fiber 11 emits linearly polarized light and supports two orthogonal polarization waveguide modes, but only one polarization is allowed to oscillate by using a grating tap or Brewster grating 90 as shown in the arrangement of FIG. 6. Thus, a predetermined amount of light is coupled out along one polarization and causes that polarization to experience more loss than the other. As a result fiber laser 12 lases only in the less lossy polarization mode $E^{oo}{}_R$ and causes probe beam 32 to be linearly polarized output $E^{oo}{}_P$. Hence probe beam 32 exits DBR 18 linearly polarized along the y axis only. λ/4 plate 110 renders polarization $E^{oo}{}_P$ of probe beam 32 circular in the counterclockwise direction. Upon reflection from surface 60 of object 34 the polarization changes its sense, thus imparting signal beam 36 with clockwise polarization $E^{oo}{}_S$. Then, in passing through λ/4 plate 110 signal beam 36 recovers linear polarization but aligned with the non-oscillating polarization waveguide mode. Hence, signal beam 36 will alone serve as optical perturbation 44 and is preferably out-coupled by Brewster grating 90 in the arrangement of FIG. 6.

Alternatively, the pump power may be adjusted such that the losses experienced by the non-oscillating polarization modes caused by Brewster grating 90 are counter-balanced by the introduction of $E^{oo}{}_S$ into cavity 14 with polarization aligned with the non-oscillating polarization modes. Given the birefringence of emissive fiber 11, the length of cavity 14 can be adjusted such that the frequency of $E^{oo}{}_S$ closely matches the frequency of one of the suppressed longitudinal modes. This arrangement is commonly referred to as "laser injection seeding" and it promotes the oscillation of one of the suppressed longitudinal modes. Optical perturbation 44 in this case is a previously suppressed polarization mode. Additionally, the embodiment of FIG. 7B can be modified by allowing both polarization modes to oscillate, resulting in $E^{oo}{}_S$ being aligned with $E^{oe}{}_R$ and $E^{oe}{}_S$ being aligned with $E^{oo}{}_R$. Under these circumstances, optical perturbation 44 is a beat signal with beat frequency $\omega_{beat} = |\omega_o - \omega_e|$.

FIG. 8A illustrates a portion of a scanning system 120 according to the invention and taking advantage of a highly integrated construction permitted by the use of a fiber laser 122. This embodiment employs a double-clad emissive fiber 124. Referring to the cross-sectional view of FIG. 8B, emissive fiber 124 has an active central core 126, which may be made using a variety of available host materials doped with a variety of laser active ionic species as described above. Active core 126 is surrounded by an inner cladding 128, which acts as a waveguide to carry a pump beam 136 (see FIG. 8A) that is eventually coupled into active central core 126, where it is absorbed by the laser active medium. Inner cladding 128 is surrounded by outer cladding 129, which provides part of the waveguiding function of inner cladding 128.

Preferably, emissive fiber 124 is a double-clad upconversion emissive fiber and thus fiber laser 122 is an upconversion fiber laser. Upconversion fiber lasers are well-known for producing reliable and efficient blue or green laser light. In the conventional single-step optical pump process absorption of one pump photon is sufficient to excite an active ion to the upper laser level and in which the laser light always has a lower photon energy, i.e., a longer wavelength, than the pump light. The upconversion pump process is a multi-step process in which more than one photon excites an active ion to the upper laser level and in which the laser light usually has a shorter wavelength than the pump light. Also, the use of double-clad fibers permits the use of high power (100 mW or more) multi-mode or broad area laser diode (semiconductor laser) pump sources.

Referring back to FIG. 8A, a semiconductor laser 130 with contacts 132 and 134 for controlling its output, e.g., providing a pulsed light, is used to deliver pump beam 136 at pump wavelength $\lambda_{pump}$. A lens 138 is positioned in the path of pump beam 136 to focus it on inner cladding 128 of emissive fiber 124. In this manner the pumping radiation, after being admitted through a DBR 140, propagates within inner-cladding 128 and is absorbed by active central core 126.

A lasing cavity 142 is formed between DBR 140 and DBR 144. The active medium is confined to active central core 126. Thus, a probe beam 146 generated by laser 122 oscillates in and exits from core 126 while inner cladding 128 carries pump beam 136 and allows it to excite the active lasing medium or active central core 126. The excited active medium provides optical gain within the resonant cavity thereby causing laser oscillation. It is well-known in the art that higher pumping powers produce higher laser output. This is specifically facilitated by the double-clad structure of emissive fiber 124.

In this embodiment a polarizing element 148, such as a λ/4 retardation plate, is mounted directly on fiber laser 122 adjacent to DBR 144. This integration further conserves space and is particularly well-suited for medical applications, especially where insertion of laser 122 into a human body is necessary. Of course, lenses, scanning mechanisms and other elements can be mounted after element 148 for particular applications.

Advantageously, a transducer 150 is mounted directly around fiber 124' to collect light that is deflected out through the side of emissive fiber 124 by a Brewster grating located beneath it (see FIGS. 5 and 6). Transducer 150 may be a photodiode or another type of optical detector. Electrical leads 152 are provided for receiving the electrical signal produced by the optical perturbation coupled out from cavity 142.

This embodiment functions according to any of the detection techniques described above. Its main advantage is the high level of integration, flexibility, simplicity and low construction costs.

Figure 9:
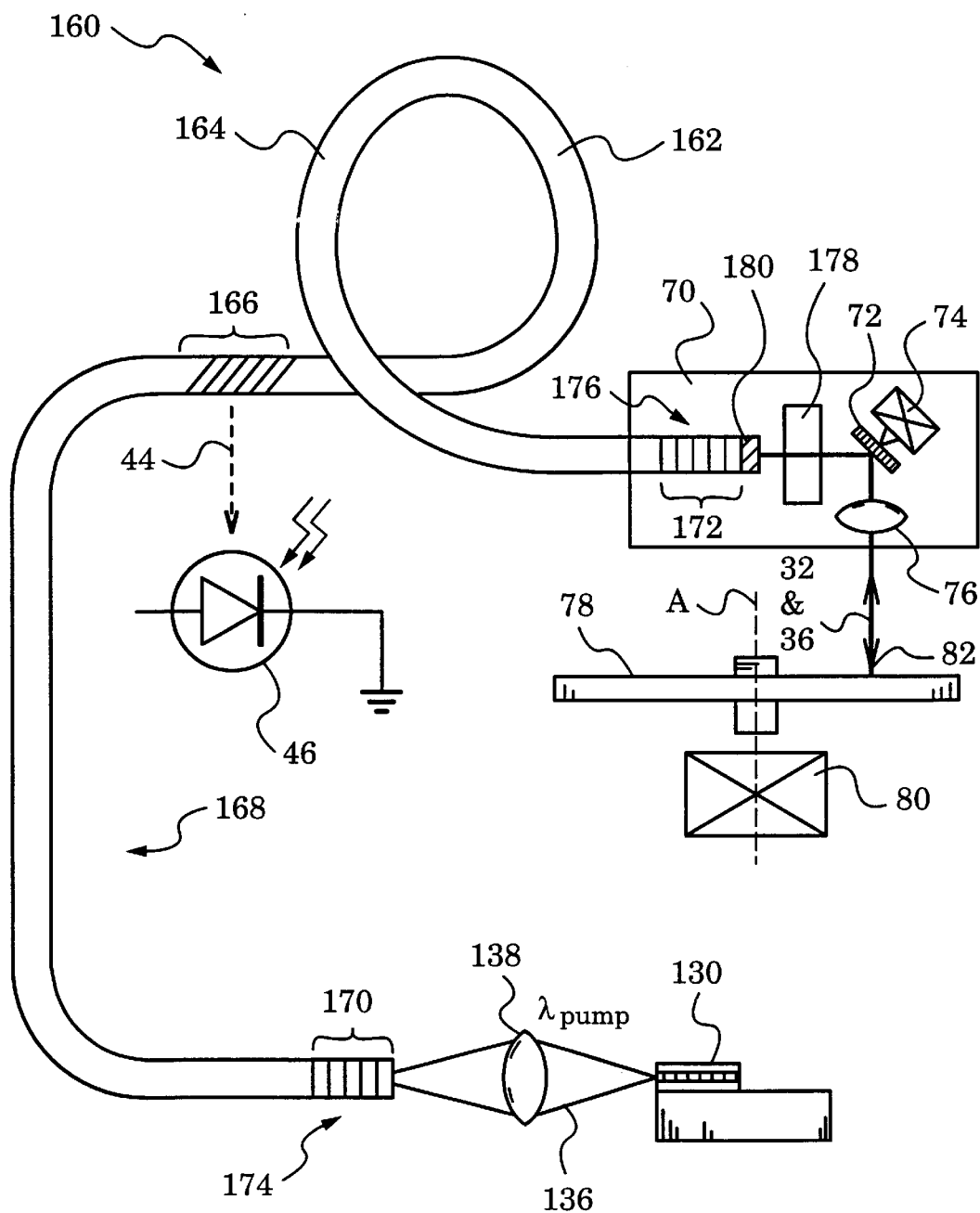
FIG. 9 is a diagram of a preferred embodiment of the system of the invention.

A preferred scanning system 160 of the invention for use in optical data storage is shown in FIG. 9. System 160 takes advantage of optical head 70 as described in FIG. 4, detection methods as described in FIG. 7B and pumping arrangement as shown in FIG. 8A. The same reference numbers are used to designate corresponding parts. System 160 also employs an emissive fiber 162 which has an active core capable of supporting two orthogonal waveguide modes. A $\lambda/4$ retardation plate 180 is mounted directly to second end 176 of fiber laser 164 to allow one of the detection methods provided by the arrangement described in FIG. 7B to be used. Emissive fiber 162 is also a double-clad type fiber using the pumping arrangement shown in FIG. 8A.

A Brewster grating 166 is positioned within lasing cavity 168 to out-couple optical perturbation 44 to detector 46. Two DBRs 170 and 172 at first end 174 and second end 176 of emissive fiber 162 are used to define cavity 168.

The operation of system 160 is as described above. An additional intensity modulating element or optical switch 178 is mounted in Optical Head 70 and is used to modulate the intensity of probe beam 32, or to switch probe beam 32 on and o f f rapidly for writing data into disk 78. Many different methods and devices for intensity modulation may be used for this application. Suitable devices include well-known electro-optic type modulators, acousto-optic type modulators, and liquid crystal type modulators used in many fields of optics and laser engineering. Use of an optical switch or modulator for rapidly pulsing the probe beam according to a predetermined data pattern to be written on the spinning disk may also be accomplished using a Micro-Optical-Electro-Mechanical-System (MOEMS) device, such as the silicon mechanical anti-reflection switch (MARS) described by J. M. Walker, paper 2879–25, "Fabrication and performance of MARS optical modulators for fiber-to-the-home systems" in SPIE Proceedings on "Micromachining and Microfabrication Process Technology II", Volume 2879, October. 1996.

Alternatively, proper intensity modulation or pulsing of probe beam 32 may be accomplished by respectively modulating the intensity of, or pulsing the pump source, which in this case is semiconductor laser 130. In another method for pulsing probe beam 32 for writing functions, a Q-switch may be placed within cavity 168. The Q-switch may be any one of many different well known types that can be adapted for use in fiber lasers, such as waveguide acousto-optic or electro-optic shutters. Additionally, fiber laser optical modulation can be accomplished using an integrated Kerr shutter that operates on the principle of the optical Kerr effect, as described by Gary A. Ball, in U.S. Pat. No. 5,111,326, titled "Integrated Kerr Shutter and Fiber Laser Optical Modulation".

For writing functions, probe beam 32 must have sufficient power to alter an optical property of optical data storage disk 78 at scan point 82. As disk 78 rotates, a stream of data bits can be written into spinning disk 78 by pulsing, switching, or modulating probe beam 32. For reading the data bits, detection of the altered points of disk 78 is required. System 160 can then go into a read mode by decreasing the power level of probe beam 32 to a level that allows detection by using one of the methods described above, but does not at the same time alter a property of the disk at the point of detection (point 82). The function of scanning mirror 72 is the same as that described for the arrangement of FIG. 4.

Figure 10A:
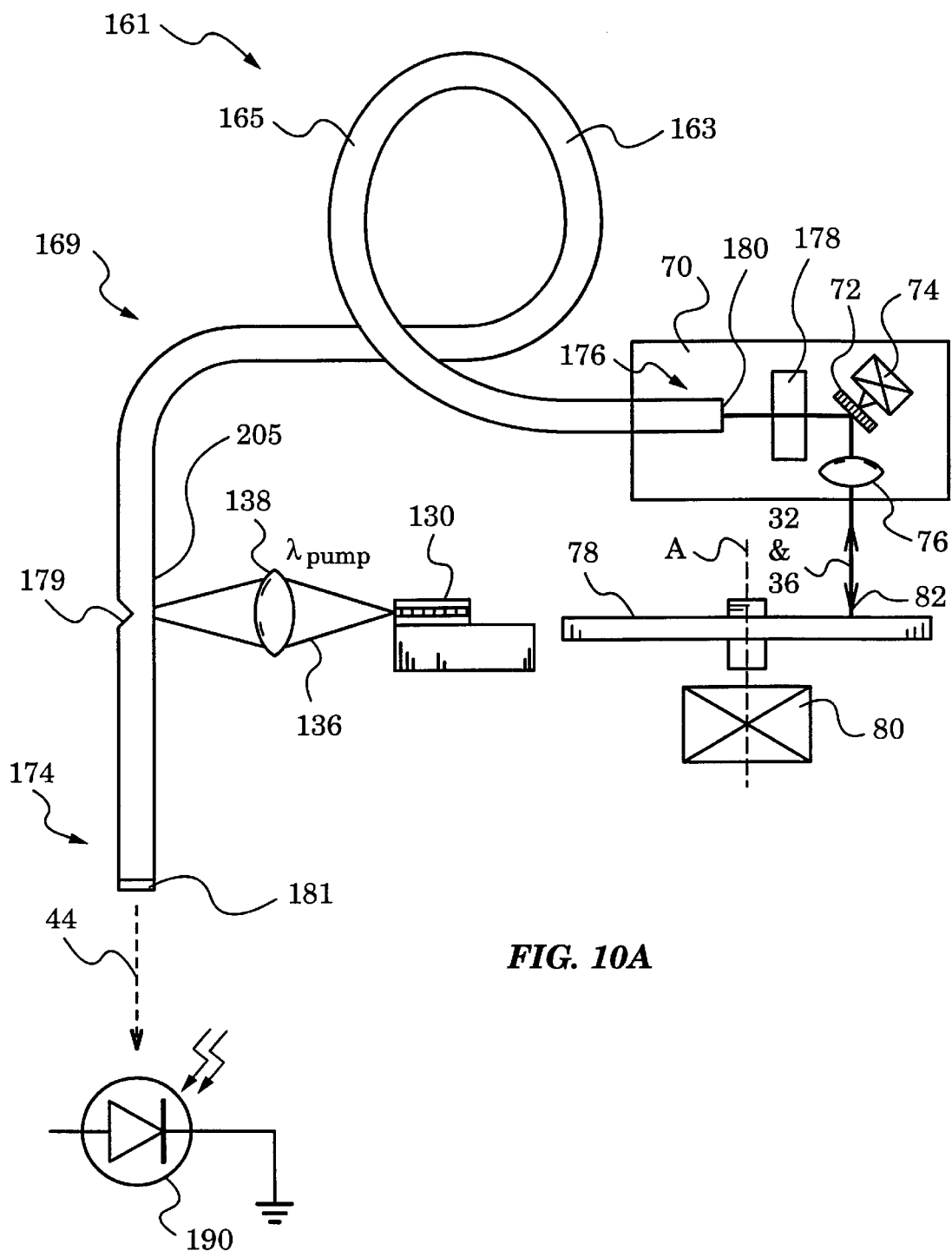
FIG. 10A is a diagram of an alternative embodiment of the invention for data storage in a side-pumping arrangement.

An alternative system 161 for use in data storage, which uses a side-pumping technique to free-up the end of the fiber laser 165 for mounting a photodiode 190 is shown in FIG. 10A. System 161 takes advantage of optical head 70 as described in FIG. 9. The same reference numbers are used to designate corresponding parts. In this embodiment, second end 176 of emissive fiber 163 has a cleaved end face 180 which may be uncoated or coated with a partially reflective coating to define the output end of a laser cavity 169 and providing the required optical feedback for laser oscillation and output coupling of probe beam 32.

In some cases where the optical gain of a particular laser line is high, output coupling can be provided just by Fresnel reflection at second end 176 and so a reflective coating is not required. Additionally, a high reflective coating 181 is used on first end 174 of emissive fiber 163 to provide the reflection means defining the other end of the laser cavity 169. Besides the substitution of coated or uncoated fiber ends in place of DBRs to complete the laser cavity 169, the primary difference between system 160 of FIG. 9 and system 161 of FIG. 10A is the repositioning of semiconductor laser 130 from a point adjacent to first end 174 of emissive fiber 163 for end-pumping fiber laser 164 in system 160 to a point adjacent to a side wall 205 of emissive fiber 163 for side-pumping fiber laser 165 in system 161. This arrangement then allows a photodiode 190 to be moved to a position directly adjacent to first end 174 of emissive fiber 163 for receiving optical perturbation 44.

Figure 10B:
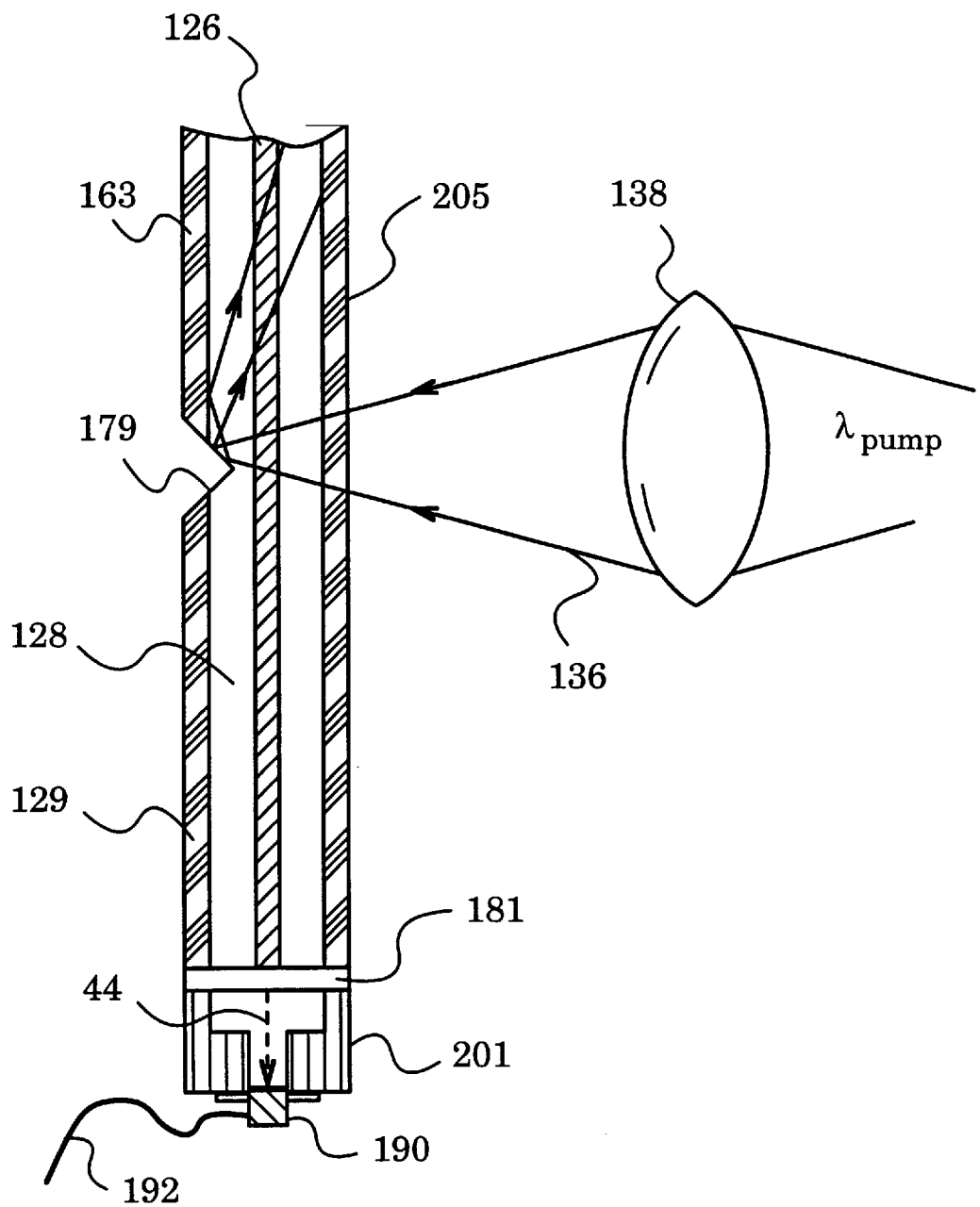
FIG. 10B is a cross-sectional view of the side-pumped section of the fiber of FIG. 10A.

The embedded V-groove side-pumping method being used in this arrangement is schematically shown in FIG. 10B. This figure also illustrates a method for integrating photodiode 190 at first end 174 of the emissive fiber laser 163 using a spacer block 201. In this method, a 90° V-groove 179 is formed directly into a fiber sidewall 205 of a double-clad emissive fiber 163. Groove 179 extends well into inner-cladding 128, but not up to the single mode active central core 126.

Pump beam 136 is injected through the fiber sidewall 205, and coupled into inner cladding 128 after undergoing a total internal reflection at the glass-air interface of V-groove 179 facet. For a 42° critical angle in glass, total internal reflection occurs for incidence angles between +3° and −45° to the fiber axis normal. The arrangement of FIG. 10A allows simple and economical construction of fiber laser confocal optical scanning system 161 for optical data storage applications. System 161 is also capable of providing high powers generated by the side-pumped emissive fiber for writing data into a data storage disk. Preferably, emissive fiber 163 is a double-clad upconversion emissive fiber and fiber laser 165 is a double-clad upconversion fiber laser.

Figure 11:
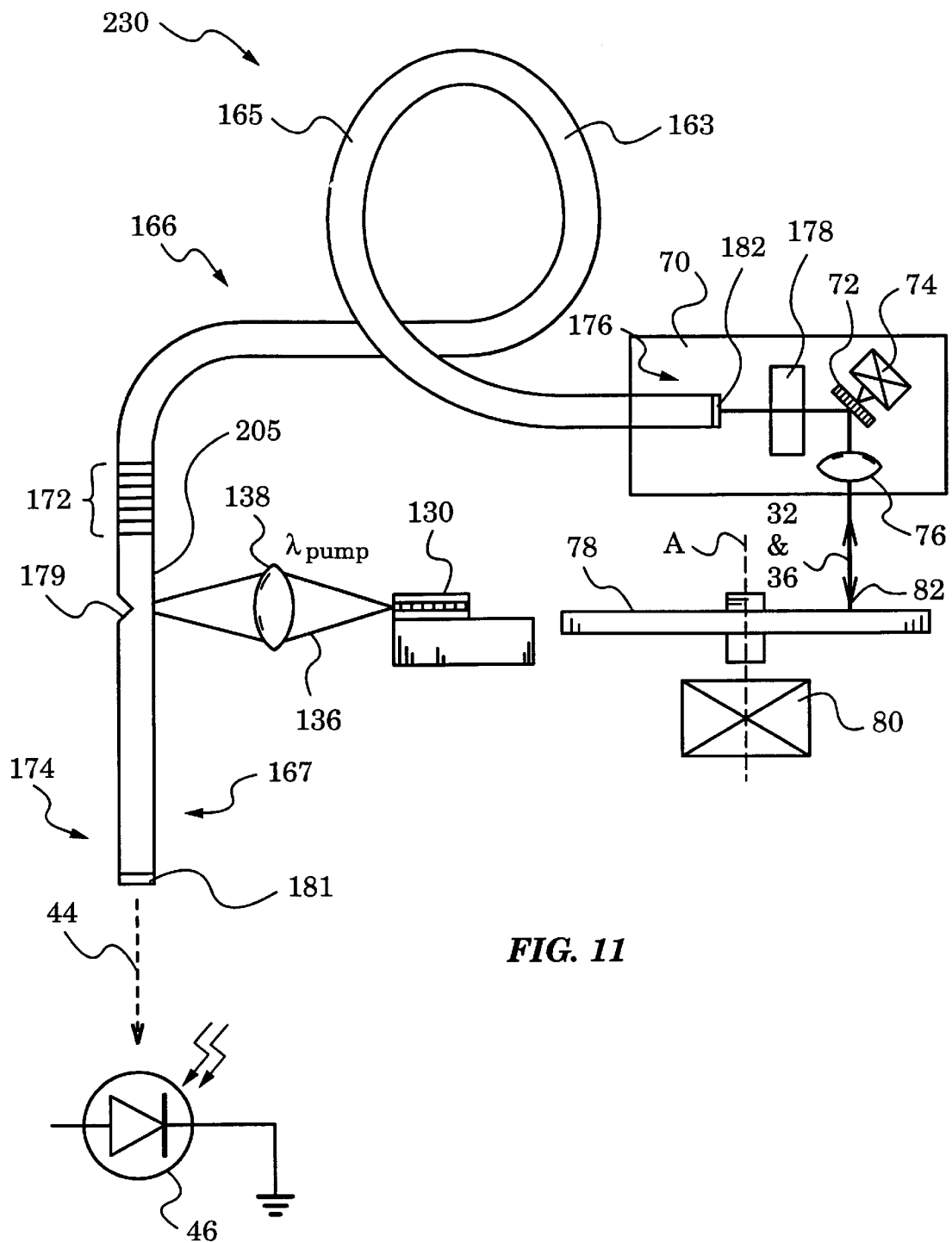
FIG. 11 is a diagram of a MOPA embodiment for data storage applications.

In another embodiment for data storage applications shown in FIG. 11, a system 230 essentially identical in most parts to the arrangement shown in FIG. 10A is altered by first substituting reflective coating 180 on second end 176 of emissive fiber 163 of system 161 in FIG. 10A, with an antireflection coating 182 for probe beam 32. Additionally, a DBR 172 is constructed in emissive fiber 163 a predetermined distance from second end 176 of emissive fiber 163. The same reference numbers used in FIG. 10A are used to designate corresponding parts in FIG. 11.

High reflective coating 181 on the face of first end 174 of emissive fiber 163 and DBR 172 define a laser cavity 167, which is side-pumped using the method of system 161 shown in FIG. 10A. DBR 172 serves as the output coupler of cavity 167 for out-coupling probe beam 32. Since the resonant cavity 167 in this case contains only a portion of emissive fiber 163, this becomes a Master Oscillator Power Amplifier (MOPA) device with the emissive fiber portion lying outside of the cavity being an optical power amplifier 166 for the upconversion laser light received from the master oscillator portion of the emissive fiber within the laser cavity 167.

Operation of system 230 is as described above, but with the additional characteristics associated with having amplifying section 166 for probe beam 32 and signal beam 36. The short cavity 167 and use of a narrow-band DBR 172 in this embodiment can provide high power single longitudinal mode operation for applications that require a single frequency, or a highly coherent probe beam 32.

Another MOPA confocal system 240, also for data storage applications, is shown in FIG. 12A. System 240 employs a semiconductor seed laser 184 as a master oscillator, and a double-clad upconversion emissive fiber 163 as a side-pumped power amplifier as used in system 230. Semiconductor seed laser 184 provides a seed beam 186 at a wavelength $\lambda_{seed}$ closely matched to the optical gain wavelength of the power amplifier 166 provided by the side-pumped upconversion emissive fiber 163. First end 242 of emissive fiber 163 is inclined at an angle to provide both, in-coupling of seed beam 186 from semiconductor seed laser 184, and out-coupling of an optical perturbation 45 to photodiode 46, such that the inclined end also provides angular separation between in-coupled seed beam and out-coupled optical perturbation.

FIG. 12B shows schematically how the in-coupling of seed beam 186 and out-coupling of optical perturbation 45 is accomplished at inclined first end 242 of the double-clad emissive fiber 163. Seed beam 186 is focused into inner-cladding 128 using focusing lens 185. An antireflection coating 187 for $\lambda_{seed}$ on inclined end 242 reduces feedback into the seed source or semiconductor laser 184. Seed beam 186 is coupled into inner-cladding 128 and is guided by inner-cladding if the reflected light lies within the inner-cladding acceptance angle. A portion of seed beam 186 is coupled into active central core 126 of emissive fiber 163 where it is amplified for output at second end 176 of emissive fiber 163, thus providing a high power probe beam 32. System 240 takes advantage of optical head 70 as described in FIG. 4, and pumping arrangement as shown in FIGS. 10A and 10B. The same reference numbers are used to designate corresponding parts.

During operation of system 240 seed beam 186 from seed source 184 enters inclined first end 242 of side-pumped emissive fiber 163. Inside emissive fiber 163 seed beam 186 is amplified, thus providing probe beam 32, which is out-coupled at second end 176 of emissive fiber 163. Probe beam 32 is scanned and focused using scanning mirror 72 and focusing lens 76 respectively, which are located in optical head 70.

When system 240 is in data writing mode, probe beam 32 is increased to a sufficient power level to change an optical property of the disk at point 82 by increasing the power of pump beam 136. This is accomplished by increasing the current to semiconductor pump laser 130. Data is written on disk 78 by pulsing probe beam at a high rate. This is done by pulsing the current to seed laser 184, which in turn provides a pulsed seed beam 186 for subsequent amplification by emissive fiber 163. Since the current to semiconductor seed laser 184 controls the power of amplified probe beam 32, a pattern or sequence of data bits can be written on disk 78 by modulating or pulsing the current to seed laser 184 in a controlled manner. When system 240 is in the data reading mode, probe beam 32 is adjusted to an appropriate steady power level by adjusting the power of pump beam 136 and seed beam 186 to proper steady levels. Again, this is done by adjusting the current to semiconductor pump laser 130 and seed laser 184 respectively. Data is read from disk 78 during scanning, by using system 240 to detect a changed optical property of disk 78 at point 82 associated with a data bit, such as a change in reflectivity, which is detected by photodiode 46 receiving optical perturbation 45 from first end 242 of emissive fiber 163. In this case optical perturbation 45 is the amplified signal beam 36.

It will be clear to one skilled in the art that the above embodiments may be altered in many ways without departing from the scope of the invention. For example, the pump source for the fiber laser in a particular system may also be a fiber laser instead of the semiconductor laser shown in the figures, and the fiber laser pump source and fiber laser being pumped may be fusion spliced together. The DBRs used as cavity reflectors may be non-emissive fibers of one type fusion spliced onto the ends of an emissive fiber of another type. Also, the fiber lasers shown in the figures may be pumped with two pump lasers at different pump wavelengths. This is especially advantageous in the embodiments using upconversion fiber lasers. In this case, modulation or pulsing of the probe beam may be accomplished by modulating or pulsing only one of the two pump lasers.

The optical head, which may contain a scanning mirror, a modulator, and a lens, may be constructed using the well known MEMS and MOEMS manufacturing technologies. In the embodiment employing the MOPA arrangement, the seed source may be a light emitting diode or other light source instead of the laser diode shown. Also the inclined fiber end, which serves to isolate the seed laser from the returning signal, may be replaced with a polarizing beam splitter, an optical isolator, or any number of well known methods for optically isolating the master oscillator from the power amplifier to prevent feedback in MOPA systems.

In still another version of the side-pumped MOPA method, a birefringent or polarization maintaining emissive fiber may be used. A linearly polarized seed source is launched into the first end of the emissive fiber and amplified along a first supported polarization waveguide mode. This produces a linearly polarized probe beam at the output end. The linearly polarized probe beam passes through a $\lambda/4$ plate to become circularly polarized. Upon reflection from the data storage disk, the portion of the probe beam reflected back into the output end of the emissive fiber becomes a signal beam, and is circularly polarized in the opposite sense. This circularly polarized signal beam passes through the $\lambda/4$ plate on its way to the output end and becomes linearly polarized along a second supported polarization waveguide mode orthogonal to the first supported polarization waveguide mode. In this way, the probe beam and the signal beam are traveling in opposite directions, and are supported by polarized waveguide modes that are mutually orthogonal to each other, thus inhibiting interference between the two beams. This method allows one to isolate the two mutually orthogonally polarized beams at the first end of the emissive fiber, namely, the seed beam and the returning amplified signal beam, which can be accomplished in a number of well known methods for separation of two mutually orthogonally polarized beams, such as the use of polarizing beam splitters, prisms, birefringent plates, etc.

In view of the numerous embodiments disclosed above, it is clear that the invention can be practiced in many embodiments. Consequently, the scope of the invention should be determined by the following claims and their legal equivalents.

What is claimed is:

1. A confocal optical scanning system for scanning an object, said system comprising:
    a) a flexible optical fiber laser having a lasing cavity and being driven by a pump source to generate a probe beam;
    b) a reflecting means in said fiber laser for defining a first end of said lasing cavity;
    c) an output coupling means in said fiber laser for defining a second end of said lasing cavity and for out-coupling said probe beam;
    d) beam shaping means for focusing said probe beam on a scan point on or within said object and focusing a signal beam reflected from said scan point such that said signal beam is in-coupled into said second end of said lasing cavity;
    e) a transducer for detecting an optical perturbation in said lasing cavity; and
    f) a scanning means for moving said scan point relative to said object.

2. The system of claim 1 wherein said optical perturbation in said lasing cavity is said signal beam.

3. The system of claim 2 further comprising a polarization altering means for altering a signal polarization of said signal beam to a resonant polarization supported by said lasing cavity.

4. The system of claim 3 further comprising a Brewster grating in said fiber laser for out-coupling said signal beam to said transducer.

5. The system of claim 3 wherein said polarization altering means comprises at least one element selected from the group consisting of Faraday rotators, polarizing filters, retardation plates and polarizing plates.

6. The system of claim 2 further comprising a polarization altering means for altering a signal polarization of said signal beam to a non-resonant polarization not supported by said lasing cavity.

7. The system of claim 6 further comprising a Brewster grating in said fiber laser for out-coupling said signal beam to said transducer.

8. The system of claim 6 wherein said polarizing means comprises at least one element selected from the group consisting of Faraday rotators, polarizing filters, retardation plates and polarizing plates.

9. The system of claim 1 wherein said optical perturbation in said lasing cavity comprises an oscillation mode of said lasing cavity induced by said signal beam.

10. The system of claim 9 further comprising an out-coupling element for out-coupling said oscillation mode to said transducer.

11. The system of claim 1 wherein said optical perturbation in said lasing cavity comprises a combination of said signal beam and said probe beam.

12. The system of claim 11 further comprising a polarization altering means for altering a signal polarization of said signal beam to a resonant polarization supported by said lasing cavity, said probe beam comprising said resonant polarization.

13. The system of claim 12 wherein said polarization altering means comprises at least one element selected from the group consisting of Faraday rotators, polarizing filters, retardation plates and polarizing plates.

14. The system of claim 1 further comprising a deflecting means for deflecting said optical perturbation to said transducer.

15. The system of claim 1 wherein said pump source is selected from the group consisting of semiconductor lasers and fiber lasers.

16. The system of claim 1 wherein said reflecting means is a Distributed Bragg Reflector (DBR).

17. The system of claim 1 wherein said output coupling means is a Distributed Bragg Reflector (DBR).

18. The system of claim 1 wherein said fiber laser comprises a fiber selected from the group consisting of birefringent fibers, polarization maintaining fibers, single-mode fibers, double-clad fibers and multi-mode fibers.

19. The system of claim 18 wherein said fiber comprises a rare-earth doped active central core.

20. The system of claim 18 wherein said fiber is a double-clad fiber having an active central core surrounded by an inner cladding and said inner cladding is surrounded by an outer cladding and a pump beam generated by said pump source is coupled into said inner cladding.

21. The system of claim 20 further comprising an end-pumping coupling means for in-coupling said pump beam into said inner cladding from an end of said fiber.

22. The system of claim 20 further comprising a side-pumping coupling means for in-coupling said pump beam into said inner cladding through the side wall of said inner cladding.

23. The system of claim 1 wherein said scanning means comprises at least one element selected from the group consisting of mirrors, reflectors, acousto-optic deflectors, electro-optic deflectors, mechanical scanning mechanisms and Micro-Electro-Mechanical-Systems (MEMS) scanning micro-mirrors.

24. The system of claim 1 wherein said beam shaping means comprises at least one element selected from the group consisting of focusing lenses, GRIN lenses, focusing gratings, micro-lenses, diffractive lenses, refractive lenses, Holographic Optical Elements (HOE), Solid Immersion Lenses (SIL) and binary lenses.

25. The system of claim 1 further comprising an intensity modulating means for controlling the intensity of said probe beam at said scan point.

26. The system of claim 25 wherein said intensity modulating means comprises an optical switch between said output coupling means and said object.

27. The system of claim 26 wherein said optical switch is a Micro-Optical-Electro-Mechanical-System (MOEMS) device.

28. The system of claim 25 wherein said intensity modulating means comprises at least one element selected from the group consisting of electro-optic modulators, acousto-optic modulators and liquid crystal modulators located between said output coupling means and said object.

29. The system of claim 1 wherein said fiber laser is an upconversion fiber laser.

30. The system of claim 29 wherein said upconversion fiber laser comprises a fiber having a rare-earth doped fluorozirconate central core.

31. The system of claim 29 wherein said output coupling means is a an uncoated cleaved end of said upconversion fiber laser.

32. The system of claim 29 wherein said pump source comprises at least two semiconductor lasers generating pump beams at different pump wavelengths.

33. The system of claim 32 wherein said probe beam is modulated in intensity by modulating the intensity of one of said at least two semiconductor lasers.

34. The system of claim 1 wherein said probe beam has a power level sufficient to alter a property of said object at said scan point.

35. The system of claim 1 wherein said object is an optical data storage disk.

36. The system of claim 35 wherein said probe beam has a power level sufficient to write data into said optical data storage disk.

37. The system of claim 1 wherein said transducer comprises a photodiode.

38. The system of claim 37 wherein said photodiode is located adjacent to one end of said fiber laser.

39. The system of claim 1 further comprising a pulsing means for pulsing said probe beam.

40. The system of claim 39 wherein said pulsing means comprises at least one element selected from the group consisting of Q-switches, waveguide acousto-optic shutters, electro-optic shutters and integrated Kerr shutters.

41. The system of claim 39 wherein said pulsing means comprises said pump source.

42. A confocal optical scanning system for scanning an object, said system comprising:
   a) a flexible optical emissive fiber being driven by a pump source and a seed source to generate a probe beam;
   b) a first end of said emissive fiber for in-coupling a seed beam from said seed source;
   c) a second end of said emissive fiber for out-coupling said probe beam;
   d) pump coupling means for coupling a pump beam from said pump source into said emissive fiber;
   e) beam shaping means for focusing said probe beam on a scan point on or within said object and focusing a signal beam reflected from said point such that said signal beam is in-coupled into said second end of said emissive fiber;
   f) a transducer for detecting said signal beam in said emissive fiber; and
   g) a scanning means for moving said scan point relative to said object.

43. The system of claim 42 wherein said pump source and said seed source are selected from the group consisting of semiconductor lasers and fiber lasers.

44. The system of claim 42 wherein said transducer is a photodiode.

45. The system of claim 44 wherein said photodiode is located adjacent to said first end of said emissive fiber.

46. The system of claim 42 wherein said emissive fiber is of the type selected from the group consisting of birefringent fibers, polarization maintaining fibers, single-mode fibers, double-clad fibers and multi-mode fibers.

47. The system of claim 42 wherein said emissive fiber comprises a rare-earth doped active central core.

48. The system of claim 42 wherein said emissive fiber is a double-clad fiber having an active central core surrounded by an inner cladding and said inner cladding is surrounded by an outer cladding and said pump beam is coupled into said inner cladding.

49. The system of claim 48 wherein said pump coupling means is located at said first end of said emissive fiber such that said pump beam is in-coupled into said inner cladding at said first end.

50. The system of claim 48 wherein said pump coupling means is a side-pumping coupling means for in-coupling said pump beam into said inner cladding through the side wall of said inner cladding.

51. The system of claim 42 wherein said scanning means comprises at least one element selected from the group consisting of mirrors, reflectors, acousto-optic deflectors, electro-optic deflectors, mechanical scanning mechanisms and Micro-Electro-Mechanical-Systems (MEMS) scanning micro-mirrors.

52. The system of claim 42 wherein beam shaping means comprises at least one element selected from the group consisting of focusing lenses, GRIN lenses, focusing gratings, micro-lenses, diffractive lenses, refractive lenses, Holographic Optical Elements (HOE), Solid Immersion Lenses (SIL) and binary lenses.

53. The system of claim 42 wherein said emissive fiber is of the upconversion type such that said probe beam has a shorter wavelength than the wavelength of said pump beam.

54. The system of claim 53 wherein said emissive fiber has a rare-earth doped fluorozirconate central core.

55. The system of claim 53 wherein said pump source comprises at least two semiconductor lasers operating at different wavelengths.

56. The system of claim 55 wherein said probe beam is modulated in intensity by modulating the intensity of one of said at least two semiconductor lasers.

57. The system of claim 42 wherein said object is an optical data storage disk.

58. The system of claim 57 wherein said probe beam has a power level sufficient to write data into said optical data storage disk.

59. The system of claim 42 wherein said probe beam is modulated in intensity by modulating the intensity of said pump source.

60. The system of claim 42 wherein said probe beam is modulated in intensity by modulating the intensity of said seed source.

61. The system of claim 42 wherein said seed source is a fiber laser integral to said emissive fiber.

62. The system of claim 61 wherein said fiber laser is integrated to said emissive fiber through at least one Distributed Bragg Reflector (DBR).

* * * * *

UNITED STATES PATENT AND TRADEMARK OFFICE
CERTIFICATE OF CORRECTION

PATENT NO. : 5,887,009
DATED : March 23, 1999
INVENTOR(S) : Micheal Mandella et al.

It is certified that error appears in the above-identified patent and that said Letters Patent is hereby corrected as shown below:

n the title page, Item [56], under Attorney, Agent, or Firm change "Luren" to --Lumen--.

Signed and Sealed this

Thirteenth Day of July, 1999

Attest:

Q. TODD DICKINSON

Attesting Officer

Acting Commissioner of Patents and Trademarks